United States Patent [19]

Ito et al.

[11] Patent Number: 5,191,624
[45] Date of Patent: Mar. 2, 1993

[54] OPTICAL INFORMATION STORING APPARATUS AND METHOD FOR PRODUCTION OF OPTICAL DEFLECTOR

[75] Inventors: Kenchi Ito; Kazumi Kawamoto, both of Yokohama; Naoya Kanda, Yokosuka; Yasuo Hira, Yokohama; Hidemi Sato, Yokohama; Atsuko Fukushima, Yokohama; Masataka Shiba, Yokohama; Akira Inagaki, Yokohama; Minoru Yoshida, Yokohama, all of Japan

[73] Assignee: Hitachi, Ltd., Tokyo, Japan

[21] Appl. No.: 762,935

[22] Filed: Sep. 19, 1991

[30] Foreign Application Priority Data

Sep. 19, 1990 [JP] Japan .................................. 2-247264
Oct. 19, 1990 [JP] Japan .................................. 2-278983

[51] Int. Cl.⁵ .......................... G02B 6/00; G02B 6/36
[52] U.S. Cl. .................................... 385/7; 369/44.11
[58] Field of Search .................... 385/4, 7, 8, 10, 14, 385/33; 369/44.11, 44.12

[56] References Cited

U.S. PATENT DOCUMENTS 3,655,261 4/1972 Chang ...................................... 385/7
4,738,501 4/1988 Sunagawa et al. .................... 385/7

FOREIGN PATENT DOCUMENTS 60-129938 7/1985 Japan .
60-156015 8/1985 Japan .
2-153329  6/1990 Japan ...................................... 385/7

OTHER PUBLICATIONS

Li et al., "Electrooptic Constants In Ion-Exchanged . . . Waveguides", *Inst. of Electronic Inf. Commun.,*, Tech. Report OQE86-119, pp. 15-22.
Hinkov et al., "Efficient Acoustooptical Coupling . . . In . . . Channel Guide," *IEEE Int. Guided Wire Optics*, Paper TUAA4-1 (1989), pp. 138-141.
Hinkov et al., "Integrated Acousto-Optic Collinear . . . Mode Convertors . . . ", *Electronics Lett.*, vol. 27, No. 13, Jun. 20, 1991, pp. 1211-1213.

*Primary Examiner*—Akm E. Ullah
*Attorney, Agent, or Firm*—Antonelli, Terry, Stout & Kraus

[57] ABSTRACT

An optical waveguide is comprised of an optical substrate and an optical thin-film optical waveguide layer and formed such that $$n_{o1}\sin\theta < \sqrt{n_{o2}^2 - n_{o1}^2} \text{ or } n_{e1}\sin\theta < \sqrt{n_{e2}^2 - n_{e1}^2}$$

where $\theta$ is an output angle, $n_{o1}$ is an ordinary refractive index of the optical substrate for an ordinary beam, $n_{e1}$ is an extraordinary refractive index of the optical substrate for an extraordinary beam, $n_{o2}$ is an ordinary refractive index of the optical thin-film optical waveguide layer for the ordinary beam and $n_{e2}$ is an extraordinary refractive index of the optical thin-film optical waveguide layer for the extraordinary beam, and an electrode for generating a surface acoustic wave for diffracting light is formed on the optical waveguide to construct a collinear optical deflector. A method for production of the optical thin-film optical waveguide layer is exemplified wherein a target made of tantalic lilthium niobate or tantalic lithium niobate magnesium and an optical substrate made of lithium tantalate are prepared and an optical thin-film optical waveguide layer having a composition of tantalic lithium niobate or tantalic lithium niobate magnesium is formed on the optical substrate through an ion beam sputtering process into which oxygen can be introduced. Proton substitutes for part of an element constituting the optical thin-film optical waveguide layer.

18 Claims, 14 Drawing Sheets

OPTICAL INFORMATION STORING APPARATUS AND METHOD FOR PRODUCTION OF OPTICAL DEFLECTOR

BACKGROUND OF THE INVENTION

The present invention relates to a collinear optical deflector using an optical waveguide for a guided wave type optical device and a method for production of the same as well as an optical deflector apparatus, an optical integrated head and an optical information recording-/reproducing apparatus which utilize the optical deflector.

An electro-optical device and an acousto-optical device each using an optical waveguide have hitherto been utilized for an optical deflector, an optical integrated head, an optical modulator and an optical spectrum analyzer which use the optical deflector. A substrate used for formation of the optical devices is a substrate which is made of a material of lithium niobate $LiNbO_3$ single crystal excellent in piezoelectric properties, photoelastic properties and electro-optical effect.

For example, JP-A-60-156015 proposes a Bragg type optical deflector as an optical deflector in which, as exemplified in FIG. 9, an interdigital electrode 5 provided on the surface of an optical waveguide layer 2 formed on a Y cut $LiNbO_3$ substrate 1 generates a surface acoustic wave 4 which propagates in a direction substantially vertical to a propagation direction of a laser beam 3 so that the laser beam 3 may interact with the surface acoustic wave 4 to provide a diffracted beam 96 which is deflected with respect to an undiffracted beam 97 on the optical axis of the laser beam 3.

Recently, IEEE Integrated Guided Wave Optics Paper TuAA4—1 (1989), pp. 138 to 141, proposes a novel scheme for a collinear optical deflector in which, as exemplified in FIG. 10, an interdigital electrode 5 generates a surface acoustic wave which propagates in a direction opposite to a laser beam 3 on a proton exchanged channel type optical waveguide 3a formed on a Y cut $LiNbO_3$ substrate 1 to cause the laser beam 3 to be delivered to the interior of the substrate 1 and the output angle of an output beam 6 is controlled in a light scanning direction 9 by changing the frequency of an AC voltage applied to the interdigital electrode 5 for excitation of a surface acoustic wave.

In the latter prior art, lithium niobate $LiNbO_3$ was used as a material for the substrate of the optical deflector and the optical waveguide 3a was prepared on the substrate 1 through a proton exchange process in which titanium Ti was first heat diffused into a substrate material and thereafter the resulting substrate was heat-treated in a mixture of a weak acid such as benzoic acid $C_6H_5COOH$ or pyrophosphoric acid $H_4P_2O_7$ and a lithium salt of the weak acid to substitute protons $H^+$ in the weak acid for part of lithium ions $Li^+$ near the surface of the substrate.

However, the prior art method is disadvantageous in that because of injection of such a transition metal such as Ti, the threshold for optical damage is decreased, and in that the substitution ratio in the proton exchange process employed is high and as a result the piezoelectric effect, electro-optical effect and acousto-optical effect inherent in the $LiNbO_3$ material are degraded to a great extent to decrease the light deflection efficiency. To cope with these problems, an expedient is taken wherein the optical waveguide 3a on the substrate 1 is channeled as shown in FIG. 10 to promote the interaction efficiency of the surface acoustic wave 4 due to interdigital electrode 5 with the laser beam 3, but the channel width of the optical waveguide 3a is a small value of 40 μm, with the result that the output beam 6 is longitudinally elongated to take an oblong beam form and in addition has aberration, raising difficulties in applying the optical deflector to precision optics such as an optical integrated head.

Another prior art optical head as disclosed in JP-A-60-129938 is known which is herein illustrated in FIGS. 11A and 11B. To explain, a laser beam 3 emitted from a semiconductor laser 14 is led to an optical waveguide layer 2 formed on a substrate 1 through an end surface coupler. The beam is collimated by a coupling lens 108 of the geodesic type or the mode index type into a parallel beam. The parallel beam interacts with a surface acoustic wave 4 generated when a high-frequency AC voltage is applied to an electrode 5 so as to be diffracted to thereby provide a diffracted beam which in turn is focused by an objective lens 109 of the diffraction grating type to form a spot 110 on an optical disc 23. A returning beam is passed through the objective lens 109, surface acoustic wave 4 and coupling lens 108 and deflected by a bent type diffraction grating 111 to reach a four-division photosensor 112. Here, focusing is defined by $$S_{focusing} = (Da+Dd)-(Db+Dc) \to 0$$

pursuant to the Foucault process, tracking is defined by $$S_{tracking} = (Da+Db)-(Dc+Dd) \to 0$$

pursuant to the push-pull method and the detection signal is defined by $$S_{signal} = Da+Db+Dc+Dd.$$

By changing the frequency of the AC voltage applied to the electrode 5, the spot 110 can be moved in the x direction, namely, in the radial direction of the optical disc 23 to perform micro-seek and tracking control.

In this prior art deflector, the laser beam diffracted by the interaction with the surface acoustic wave obliquely impinges upon the objective lens 109 of diffraction grating type raising problems that the diffraction efficiency of the objective lens 109 of diffraction grating type is degraded and that aberration takes place to make it difficult to form a small light spot on the optical information recording medium. In addition, it is impossible to operate the prior art deflector in such a manner that a plurality of laser beam spots formed in line on the same track or over nearly tracks in on the optical recording medium can be scanned simultaneously in a direction vertical to the former track or the latter tracks to perform highly accurate tracking or fast micro-seek. This problem can be solved by deflecting a light beam on a plane defined by two vectors including a plane vector representative of an optical waveguide and a directional vector of the light beam propagating in the optical waveguide, so that the light beam can be deflected on the optical recording medium radially thereof. Optical deflection means for this purpose is disclosed in U.S. Pat. No. 3,655,261 and herein illustrated in FIG. 12. Referring to FIG. 12, thanks to an optical deflector 5a, a surface acoustic wave 4 interacts with a laser beam 3 to cause the laser beam 3 to be delivered from a waveguide layer 2 to the interior of a substrate 1 and by changing the wavelength of the surface acoustic wave 4, the output angle can be changed. But, due to the fact that the input laser beam and the output laser beam are beams of the same polarization and an orthogonal relation exists between the beams of the same polarization, the optical deflector 5a is not expected to exhibit a high deflection efficiency and is considered to be unsuitable for employment in an optical information storing apparatus for which a high light utilization efficiency is required.

SUMMARY OF THE INVENTION

An object of the invention is to provide an optical information storing apparatus, including a collinear optical deflector, an optical deflector apparatus, an optical integrated head and an optical information recording and reproducing apparatus, in which the time required for an optical head to access a predetermined track for the purpose of performing read/write of information can be reduced and a read/write operation can be done with high accuracy and high reliability and besides to provide a method for production of the collinear optical deflector.

The collinear optical deflector will first be described. To accomplish the above object, a collinear optical deflector according to the invention comprises, an shown in FIGS. 1A and 1B, an optical waveguide including an optical substrate 1 which serves as either an optical substrate having anisotropy of refractive index to exhibit an ordinary refractive index $n_{o1}$ and an extraordinary refractive index $n_{e1}$ or an isotropic optical substrate exhibiting $n_{o1}=n_{e1}$ and an optical thin-film optical waveguide layer 2 formed on the optical substrate 1 and serving as either an optical thin-film optical waveguide layer having anisotropy of refractive index to exhibit an ordinary refractive index $n_{o2}$ and an extraordinary refractive index $n_{e2}$ or an isotropic optical thin-film optical waveguide layer exhibiting $n_{o2}=n_{e2}$, wherein the two ordinary refractive indexes $n_{o1}$ and $n_{o2}$ lie in or are for the same direction and the two extraordinary refractive indexes $n_{e1}$ and $n_{e2}$ lie in or are for the same direction, and an electrode 5 formed on the optical thin-film optical waveguide layer 2 for generating a surface acoustic wave which has the function to deliver a laser beam propagating in the optical thin-film optical waveguide layer in a direction which makes an angle $\theta$ to the surface of the optical thin-film optical waveguide layer, wherein the relation between the output angle $\theta$ and the two ordinary refractive indexes $n_{o1}$ and $n_{o2}$ or the two extraordinary refractive indexes $n_{e1}$ and $n_{e2}$ satisfies $$n_{o1}\sin\theta < \sqrt{n_{o2}^2 - n_{o1}^2} \text{ or}$$

$$n_{e1}\sin\theta < \sqrt{n_{e2}^2 - n_{e1}^2}$$

where $n_{o1}$ is a refractive index that the optical substrate 1 exhibits for an ordinary beam, $n_{e1}$ is a refractive index that the optical substrate 1 exhibits for an extraordinary beam, $n_{o2}$ is a refractive index that the optical waveguide layer 2 exhibits for the ordinary bean and $n_{e2}$ is a refractive index that the optical waveguide layer 2 exhibits for the extraordinary beam.

When the optical substrate is a lithium tantalate LiTaO$_3$ substrate, the optical thin-film optical waveguide layer 2 may be a lithium niobate LiNbO$_3$ or tantalic lithium niobate LiNb$_x$Ta$_{1-x}$O$_3$ thin-film optical waveguide layer, where $0<x\leq 1$, or a tantalic lithium niobate magnesium Li$_y$Mg$_z$Nb$_x$Ta$_{1-x}$O$_3$ thin-film optical waveguide layer where $(y+Z)/2\approx 1$ and $0<x\leq 1$.

When the optical substrate 1 is a lithium tantalate LiTaO$_3$ substrate, the optical thin-film optical waveguide layer 2 may be a niobium pentoxide Nb$_2$O$_5$ or titanium oxide TiO$_2$ thin-film optical waveguide layer.

In a method for production of a collinear optical deflector according to the invention, for preparation of the tantalic lithium niobate or tantalic lithium niobate magnesium thin-film optical waveguide layer 2, a starting layer is first formed through an ion beam sputtering process in which three or four ion sources and targets are provided above the lithium tantalate substrate and oxygen can be introduced to the neighborhood of the substrate 1, and then annealing the thus formed layer at 600° C. to 1000° C. in an oxygen ambient atmosphere.

The tantalic lithium niobate or tantalic lithium niobate magnesium thin-film optical waveguide layer 2 may be prepared through the steps of forming a molten material by heating and melting a starting powder material for the optical thin film in the presence of flux in an oxygen and water vapor ambient atmosphere, and dipping the surface of a lithium tantalate substrate in the molten material, decreasing the temperature of the molten material to its crystal precipitation temperature and forming the optical thin-film through liquid-phase epitaxial growth.

An optical deflector apparatus according to the invention comprises a collinear optical deflector including an optical waveguide comprised of an optical waveguide layer formed on the optical substrate and an electrode for excitation of a surface acoustic wave formed on the optical waveguide layer, and means for coupling a light beam into the optical waveguide layer, the means for coupling a light beam into the optical waveguide layer including a grating coupler comprised of a diffraction grating formed on the optical waveguide layer.

An optical integrated head according to the invention comprises the optical deflector apparatus including a collinear optical deflector having an optical waveguide comprised of an optical waveguide layer formed on the optical substrate and an electrode for excitation of a surface acoustic wave formed on the optical waveguide layer, and light coupling means for coupling a laser beam into the optical waveguide layer; a first diffraction grating for preventing the efficiency of coupling of the laser beam to the optical waveguide from being degraded owing to variations in wavelength of the laser beam; a second diffraction grating for preventing the delivery direction of an output beam from the optical deflector from being changed with variations in laser wavelength; and lens means for focusing the output beam passed through the second diffraction grating on one point on a recording/reproducing surface of an optical recording medium provided spatially externally of the optical waveguide while the output beam being allowed to be scanned. In the optical deflector apparatus, a planar diffraction grating is interposed between the electrode for excitation of a surface acoustic wave formed on the optical waveguide layer and the light coupling means. Optics including the second diffraction grating and the lens means for focusing a reflection beam from the second diffraction grating on the surface of the light recording medium is mechanically separated from a head stationary part including the major body of the substrate of the optical deflector apparatus to form a head movable part carried on an actuator for scan driving.

An optical information recording and reproducing apparatus according to the invention comprises an optical integrated head driven for scanning by the actuator in the radial direction of an optical recording medium driven by rotational drive control means while the optical integrated head is spaced apart from the surface of the optical recording medium by a predetermined distance.

The operation of the collinear optical deflector will now be described. In particular, the principle and operation will be described on the basis of which a highly efficient collinear optical deflector can be obtained when, as explained in connection with FIGS. 1A and 1B, the output angle $\theta$ of output beam 6, the ordinary refractive indexes $n_{o1}$ and $n_{o2}$ of the optical substrate 1 and optical thin-film optical waveguide layer 2 and the extraordinary refractive indexes $n_{e1}$ and $n_{e2}$ thereof satisfy $$n_{o1}\sin\theta < \sqrt{n_{o2}^2 - n_{o1}^2} \text{ or}$$

$$n_{e1}\sin\theta < \sqrt{n_{e2}^2 - n_{e1}^2}$$

Described herein is a case where lithium tantalate LiTaO$_3$ is used for the crystalline substrate 1 and tantalic lithium niobate LiNb$_x$Ta$_{1-x}$O$_3$ where $0 < x \leq 1$ is used for the optical thin film 2.

The optical thin film LiNb$_x$Ta$_{1-x}$O$_3$ is a uniaxial crystal belonging to a trigonal system, having its anisotropic axis corresponding to a Z axis (c axis), an x axis in a (2$\bar{1}$10) direction in hexagonal notation and a y axis which is vertical to the x and z axes to define a right-handed system. For the convenience of tensor notation, x, y and z will hereinafter be indicated by $x_1$, $x_2$ and $x_3$, respectively. For this Cartesian coordinate system, a dielectric constant tensor [$\epsilon$] has null components excepting diagonal components and can be written as follows:

$$[\epsilon] = \begin{bmatrix} \epsilon_{11} & 0 & 0 \\ 0 & \epsilon_{11} & 0 \\ 0 & 0 & \epsilon_{33} \end{bmatrix} \quad (1)$$

When an inverse tensor of [$\epsilon$] is defined by $$[B] = [\epsilon]^{-1} \quad (2)$$

there results $$[B] = \begin{bmatrix} 1/\epsilon_{11} & 0 & 0 \\ 0 & 1/\epsilon_{11} & 0 \\ 0 & 0 & 1/\epsilon_{33} \end{bmatrix} \quad (3)$$

When a strain (indicated by a tensor [S]) and an electrostatic field (indicated by a vector $\bar{E}^c$) are applied to LiNb$_x$Ta$_{1-x}$O$_3$, the tensor [B] is changed by a tensor [$\Delta$B]. At that time, there result a photoelastic effect $\Delta B_{ij}$ which is given by $$\Delta B_{ij} = \sum_{k,l} P_{ijkl} S_{kl} \quad (4)$$

where $$S_{kl} = \frac{1}{2}\left(\frac{\partial u_l}{\partial x_k} + \frac{\partial u_k}{\partial x_l}\right) \quad (5)$$

and where $P_{ijkl}$ represents a photoelastic tensor, and $u_l$ and $u_k$ represent a displacement of the medium, and an electro-optical effect $\Delta B_{ij}$ which is given by $$\Delta B_{ij} = \sum_k r_{ijkl} E_k^c \quad (6)$$

where $r_{ijk}$ represents an electro-optical constant. When the above two effects coexist, there results $$\Delta B_{ij} = \sum_{k,l} P_{ijkl} S_{kl} + \sum_k r_{ijkl} E_k^c \quad (7)$$

Then, When taking a case where a surface acoustic wave is generated in a LiNb$_x$Ta$_{1-x}$O$_3$ substrate by means of an interdigital electrode and caused to propagate in the surface of the substrate, for instance, the surface acoustic wave, which is equivalent to a wave of strain in the medium propagating near the surface, is accompanied by a strain tensor [S]. Since there occurs a piezoelectric field $\bar{E}^c$ concomitant with the strain [S] owing to the piezoelectric effect, the effect $\Delta B_{ij}$ pursuant to equation (7) is induced by the surface acoustic wave.

Especially in the case where when an optical thin film 2 is assumed which is formed on a Z cut LiTaO$_3$ substrate 1 cut vertically to the $x_3$ axis and has the piezoelectric, photoelastic and electro-optical effects, the interdigital electrode 5 is disposed vertically to $x_z$ axis and the surface acoustic wave 4 propagates in the $x_z$-axis direction. Then, a TE wave of laser beam 3 which is polarized in the $x_1$-axis direction is caused to propagate in the optical thin-film optical waveguide layer 2. The surface acoustic wave 4 then generates a non-diagonal component $\Delta B_{13}$ of the tensor [$\Delta$B] and this component is written as follows:

$$\Delta B_{13} = 2P_{1313}S_{13} + 2P_{1312}S_{12} + 2r_{131}E_1^c \quad (8)$$

By Virtue of this non-diagonal component $\Delta B_{13}$, mode coupling takes place between a TE wave of the laser beam 3 and a TM wave thereof polarized vertically to the TE wave, that is, in the $x_3$-axis direction. Especially, by adjusting the refractive index such that the TM wave behaves in a radiation mode, an output beam 6 can be delivered from the optical waveguide layer 2 to the outside of the substrate 1. The output angle $\theta$ of the output beam 6 is determined by a wavelength $\Lambda$ of the surface acoustic wave 4 as follows:

$$k_o N + \frac{2\pi}{\Lambda} \cdot m = k_o n_{e1} \cos\theta \quad (9)$$

where $$k_o = \frac{2\pi}{\lambda}$$

($\lambda$ being the wavelength of light) stands, N is an effective refractive index of guided TE mode, m is an integer and $n_{e1}$ is the extraordinary refractive index of LiTaO$_3$. The wavelength $\Lambda$ of the surface acoustic wave 4 can be changed by changing the frequency of a high-frequency voltage applied to the interdigital electrode 5 and accordingly the output angle $\theta$ can be changed with the frequency to meet the necessary performance of the optical deflector.

The efficiency $\eta$ of the collinear optical deflector is given by $$\eta = 1 - e^{-2\alpha L} \tag{10}$$

where L is a propagation length of the surface acoustic wave 4 and $\alpha$ is a radiation loss coefficient. The radiation loss coefficient $\alpha$ can be expressed by the following equation:

$$2\alpha \approx 2\pi \left(\frac{n_{01}}{n_{e1}}\right) \frac{N}{n_{e1} \cos\theta} |c|^2 \tag{11}$$

$$c = \frac{\omega}{2P} \epsilon_0 \int_{-\infty}^{0} dx_3 \, n_{01}^2 \, n_{e1}^2 \, E_3^* (X_1) E_1(X_1) \Delta B_{13} \tag{12}$$

($i = 1$ or 2)

where $n_{e2}$ is the extraordinary refractive index of LiNb$_x$Ta$_{1-x}$O$_3$, $n_{o2}$ is the ordinary refractive index thereof, $\omega$ is an angular frequency of the laser beam, P is a power of the laser beam, $\omega$ is dielectric constant of vacuum, $E_1(x_3)$ is a electric field distribution of a TM radiation mode and $E_3(x_3)$ is an electric field distribution of a TE radiation mode. As will be seen from equations (10) to (12), it is necessary to obtain a large value of the radiation loss the coefficient $\alpha$, namely, coefficient c, in order to obtain a large value of the efficiency $\eta$. To obtain a large value of the coefficient c, the integral in equation (12) called an overlap integral is required to be large and to this end, the waveguide structure must be optimized such that the overlap of $E_1(x_3)$ and $E_3(x_3)$ becomes large.

It is now particularly assumed that only a single mode (TE$_o$ mode) propagates in the optical waveguide layer 2. In this case, the TE$_o$ guided wave mode changes exponentially in the layer of optical substrate 1 as indicated by $$E_1(X_3) \propto \exp(-\gamma_s X_3) \tag{13}$$

On the other hand, the TM radiation mode changes in trigonometric function fashion as indicated by $$E_3(X_3) \propto \sin(\delta_s X_3 + A) \tag{14}$$

Accordingly, in order to increase the overlap between these modes, it is important to make small and substantially equal values of a damping constant $\gamma_s$ of the TE$_o$ mode in the $X_1$ direction in equation (13) and a constant $\delta_s$ defining the period of the TM mode. Here, $$\left.\begin{array}{l}\gamma_s = k_0 \sqrt{N^2 - n_{01}^2} \\ \delta_s = k_0 \, n_{e1} \sin\theta \times \frac{n_{01}}{n_{e1}} k_0 \, n_{01} \sin\theta\end{array}\right\} \tag{15}$$

Stands and therefore in order for the value of the constant $\delta_s$ to be small, $\theta$ must be conditioned to be small.

In constructing a general optical deflector having a large output angle $\theta$, the condition of $\gamma_s \approx \delta_s$ is more important than the other of the above conditions. Since N in equation (15) satisfies the inequality $$n_{01} < N < n_{02},$$

the condition of $$n_{01} \sin\theta \approx \sqrt{N^2 - n_{01}^2} < \sqrt{n_{02}^2 - n_{01}^2} \tag{16}$$

must be satisfied for the purpose of realizing $\gamma_s \delta_s$.

FIG. 2 exemplifies the relation between a maximum value of the radiation loss coefficient $2\alpha_{max}$ and a value of $\sqrt{n^2 - n_{01}}$ which is obtained when the angle $\theta$ of output beam 6 is set to 10 degrees. The maximum value $2\alpha_{max}$ was calculated by changing only the ordinary refractive index $n_{o1}$ of substrate 1 with the extraordinary refractive index $n_{e1}$ of substrate 1 fixed to 2.181 of LiTaO$_3$ substrate 1, the maximum ordinary refractive index $n_{o2}{}^{max}$ of optical thin-film 2 fixed to 2.286 of LiNbO$_3$ and the maximum extraordinary refractive index $n_{o2}{}^{max}$ of optical thin-film 2 fixed to 2.200 of LiNbO$_3$, to optimize x and a thickness d of an LiNb$_x$Ta$_{1-x}$O$_3$ thin-film 2 under the condition that the ordinary refractive index $n_{o2}$ and the extraordinary refractive index $n_{e2}$ of the LiNb$_x$Ta$_{1-x}$O$_3$ thin film 2 change with x pursuant to the following equation:

$$\left.\begin{array}{l}n_{o2} = n_{o1} + (n_{02}^{max} - n_{01}) x \\ n_{e2} = n_{e1} + (n_{e2}^{max} - n_{e1}) x\end{array}\right\} \tag{17}$$

In this case, the width W of interdigital electrode 5 or surface acoustic wave 4 is designed to be 2.5 mm and the pair number $N_{IDT}$ of electrode 5 is designed to be 20. FIG. 2 shows that as the value of $\sqrt{n_{o2}^2 - n_{e1}^2}$ decreases to below $n_{e1}\sin\theta = 0.379$, $2\alpha_{max}$ decreases, thus demonstrating that the condition given in equation (16) according to the invention is very important for constructing a collinear deflector of high efficiency $\eta$.

In the foregoing, the substrate 1 and optical thin film 2 have refractive indexes in the TE guided wave mode direction (x$_1$ direction) which are ordinary refractive indexes $n_{o1}$ and $n_{o2}$ and they have refractive indexes in the TM radiation mode direction (x$_3$ direction) which are extraordinary refractive indexes $n_{e1}$ and $n_{e2}$; but conversely, when they have refractive indexes in the TE guided wave mode direction (x$_1$ direction) which are extraordinary refractive indexes $n_{e1}$ and $n_{e2}$ and refractive indexes in the TM radiation mode direction (x$_3$ direction) which are ordinary refractive indexes $n_{o1}$ and $n_{o2}$, the condition given in equation (16) is changed to $$n_{e1} \sin\theta \approx \sqrt{N^2 - n_{el}^2} < \sqrt{n_{e2}^2 - n_{el}^2} \quad (16)'$$

In this case, the value of the maximum radiation loss coefficient $2\alpha_{max}$ can also be maximized when the condition of equation (16)' is satisfied, indicating that the condition given in (16)' according to the invention is the important condition for constructing a collinear deflector of high efficiency $\eta$.

A thin-film optical waveguide layer 2 will now be considered which is a $LiNb_xTa_{1-x}O_3$ thin film practically formed on a $LiTaO_3$ substrate 1. The refractive index of this $LiNb_xTa_{1-x}O_3$ thin film is related to the composition ratio in the following manner as described previously:

$$\begin{aligned} n_{o2} &= n_{o1} + (n_o^{LN} - n_{o1})x \\ n_{e2} &= n_{e1} + (n_e^{LN} - n_{e1})x \end{aligned} \quad (17)$$

where $n_o^{LN}$ and $n_e^{LN}$ are the ordinary refractive index and the extraordinary refractive index of $LiNbO_3$, respectively.

FIG. 3 exemplifies the relation between the value of the maximum radiation loss coefficient $2\alpha_{max}$ and the composition ratio x of $LiNb_xTa_{1-x}O_3$ by using the output angle $\theta$ of output beam 6 as parameter. In this case, like the aforementioned design, the width W of the interdigital electrode 5 or surface acoustic wave is designed to be 2.5 mm and the pair number $N_{IDT}$ is designed to be 20. It will be seen from FIG. 3 that for any of the values 2, 5, 7 and 10 degrees of output angle $\theta$, a very large value of the radiation loss coefficient $\alpha$ amounting to $10^2 m^{-1}$ in terms of $2\alpha_{max}$ can be obtained by adjusting the composition ratio x. When the propagation length L of surface acoustic wave 4 is set to 2 cm for this value of $\alpha = 10^2 m^{-1}$, $\alpha L = 2$ stands and the optical deflector can have a high efficiency of $\eta \approx 0.86$ pursuant to equation (10), thus ensuring practical availability of the optical deflector.

All of the previously-described embodiments have been described by referring to a typical specific example using $LiNb_xTa_{1-x}O_3$, where $0 < x \leq 1$, for the optical thin film, but comparable characteristics can be obtained with an optical thin film having a composition of $Li_yMg_zNb_xTa_{1-x}$, where $(y+z)/2 \approx 1$.

A method for formation of the optical thin-film optical waveguide layer will now be described wherein protons are substituted for part of an element constituting an anisotropic material. More specifically, protons H are substituted for part of Li of an optical waveguide layer 2 having a composition of $LiNbO_3$. As known in the art, however, after proton exchange, the electro-optical coefficient becomes very small as compared to that of bulk $LiNbO_3$. For example, according to a literature by Ko et al. (The Institute of Electronic Information Communication, Technical Report OQE86-119 pp. 15 to 22), the coefficient after $r_{333}$ proton exchange is reduced to about 1/15 of that before the exchange. Further, for generation of a large strain $S_{ij}$, electric power applied to the interdigital electrode (IDT) must be converted into a surface acoustic wave with high efficiency. A parameter representing the efficiency of this conversion is an electro-mechanical coupling coefficient $K^2$. Measurements conducted by the present inventors have demonstrated that the relation as shown in FIG. 19 is set up between a substitution ratio x and the electro-mechanical coupling coefficient $K^2$ when the substitution ratio x in proton exchange is defined by the following reaction formula:

$$LiN_bO_3 + xH^+ \rightarrow Li_{l-x}H_xN_bO_3 + (1-x)L_i^+ \quad (18)$$

This indicates that for generation of a large strain $S_{ij}$, the substitution ratio x must be limited to 0.3 or less. In this case, the piezoelectric constant $e_{ijk}$ and the electro-optical coefficient $r_{ijk}$ recovers the magnitude comparable to that of a bulk material and therefore, by limiting the substitution ratio x to 0.3 or less in this manner, a large value of $\Delta B_{ij}$ in equation (12) can be obtained.

DESCRIPTION OF THE PREFERRED EMBODIMENTS

Embodiments of the invention will now be described with reference to the accompanying drawings.

Figure 1A:
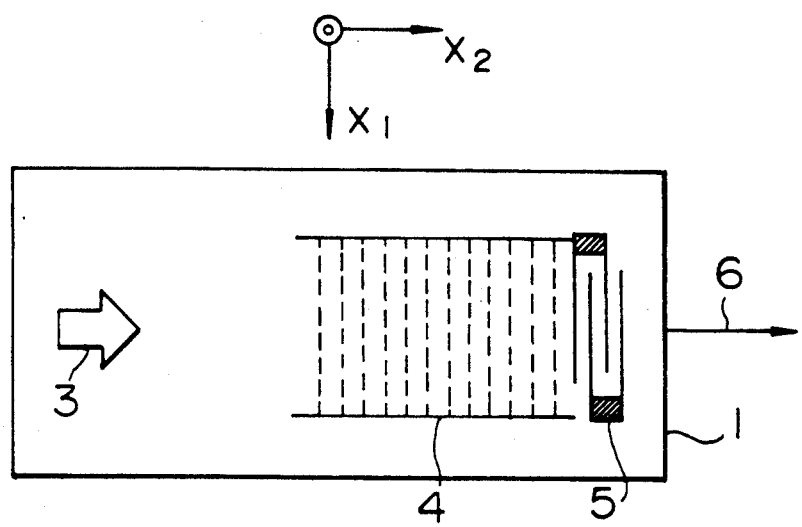
FIGS. 1A and 1B are a plan view and a sectional view useful to explain the principle of a collinear optical deflector.
Figure 1B:
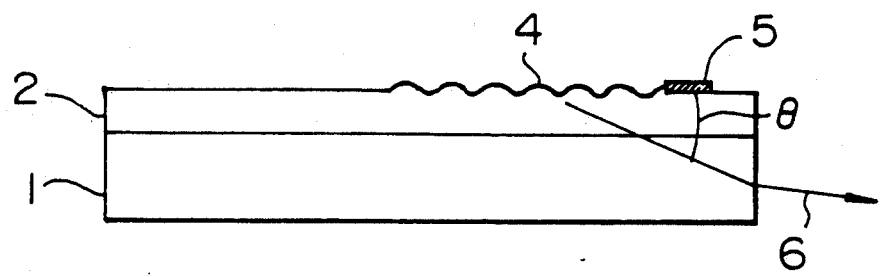
Figure 2:
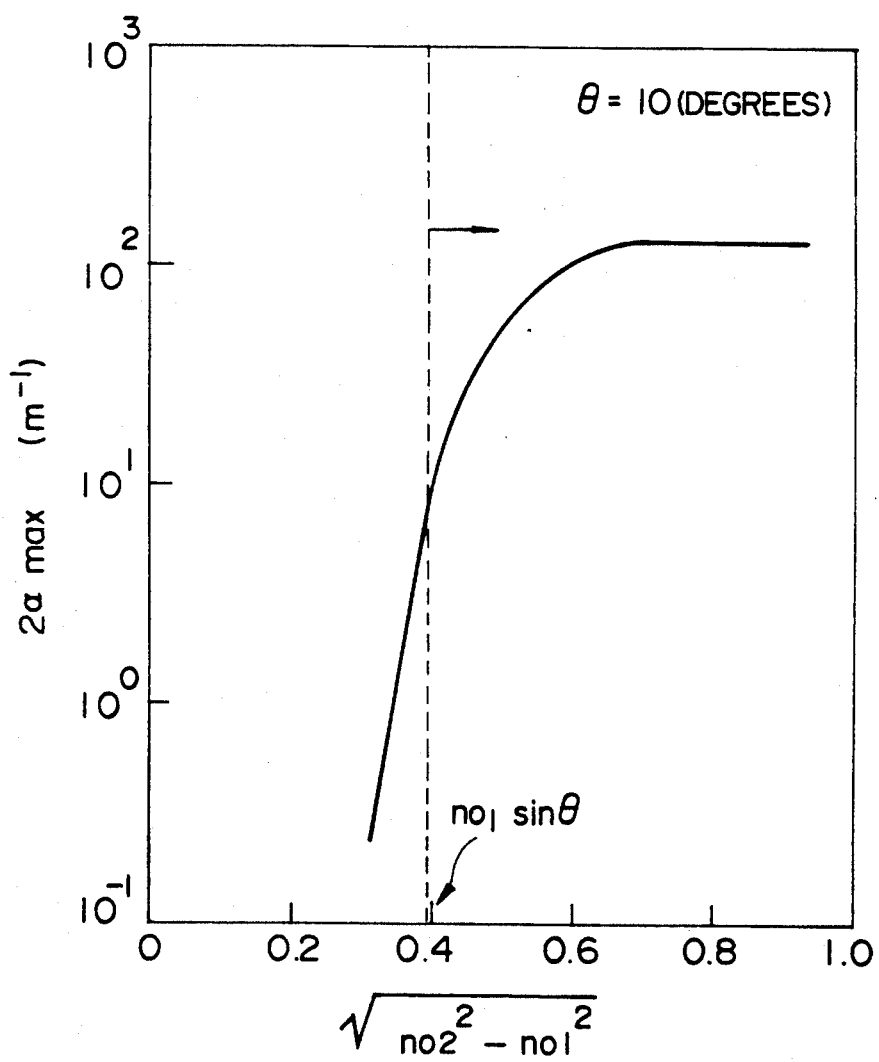
FIG. 2 is a graph showing the relation between $\sqrt{n_{o2}^2 - n_{o1}^2}$ and maximum radiation loss coefficient $2\alpha_{max}$ obtained when output angle $\theta$ of a laser beam is 10 degrees.
Figure 3:
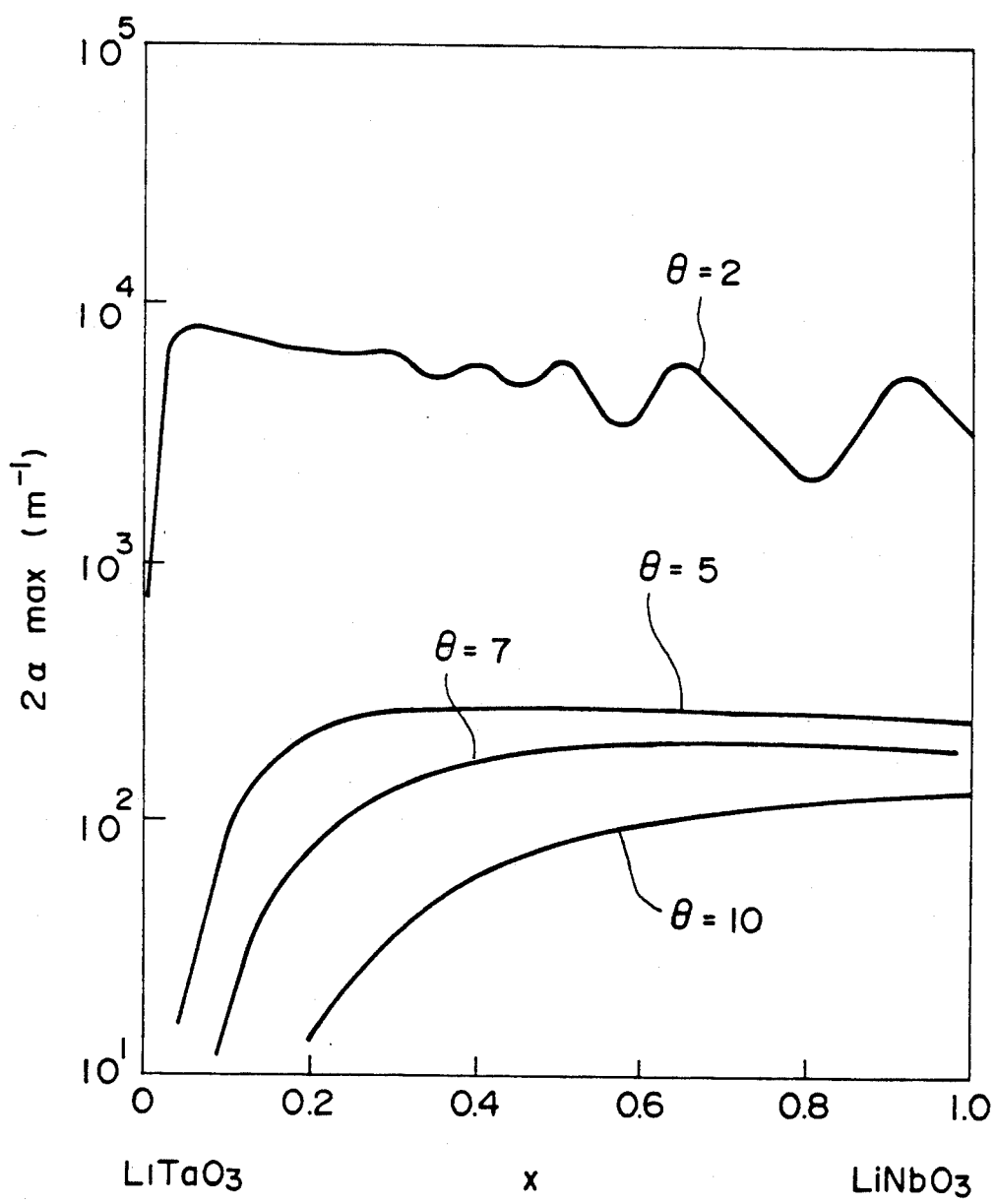
FIG. 3 is a graph showing the relation between composition ratio x and maximum radiation loss coefficient $2\alpha_{max}$.
Figure 4:
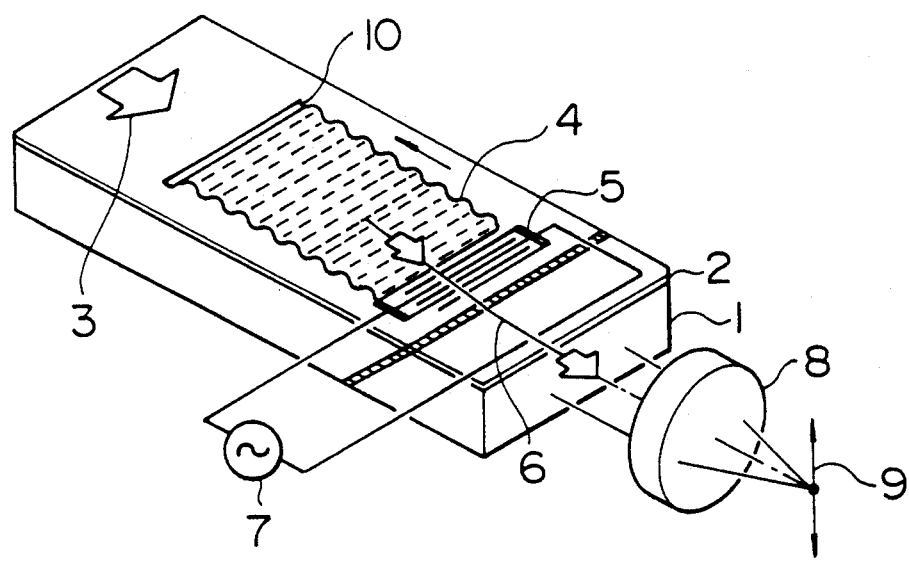
FIG. 4 is a perspective view showing an embodiment of the collinear optical deflector.

FIG. 4 is a schematic perspective view showing an embodiment of a collinear optical deflector according to the invention. In FIG. 4, reference numeral 1 designates an optical substrate (Z cut LiTaO$_3$ substrate), 2 an optical thin-film optical waveguide layer (LiNb$_x$Ta$_{1-x}$O$_3$ thin-film optical waveguide layer), 3 a laser beam, 4 a surface acoustic wave, 5 an electrode for excitation of surface acoustic wave (interdigital electrode), 6 an output light beam, 7 a high-frequency power supply for excitation of surface acoustic wave, 8 a focusing lens (condensing lens), 9 a light deflecting and scanning direction, and 10 an absorber material for the surface acoustic wave 4.

As has been explained with reference to FIGS. 1A and 1B and FIGS. 2 and 3, the collinear optical deflector comprises an optical waveguide including the Z cut LiTaO$_3$ substrate 1 which serves as either an optical substrate having anisotropy of refractive index to exhibit an ordinary refractive index n$_{o1}$ and an extraordinary refractive index n$_{e1}$ or an isotropic optical substrate exhibiting n$_{o1}$ = n$_{e1}$ and the LiNb$_x$Ta$_{1-x}$O$_3$ thin-film, optical waveguide layer 2 formed on the optical substrate 1 and serving as either an optical thin-film optical waveguide layer having anisotropy of refractive index to exhibit an ordinary refractive index n$_{o2}$ and an extraordinary refractive index n$_{e2}$ or an isotropic optical thin-film optical waveguide layer exhibiting n$_{o2}$ = n$_{e2}$, wherein refractive indexes for a direction vertical to the surfaces of the optical substrate 1 and optical thin-film waveguide layer 2 are respectively the extraordinary refractive indexes n$_{e1}$ and n$_{e2}$ and refractive indexes for a direction parallel to those surfaces are respectively the ordinary refractive indexes n$_{o1}$ and n$_{o2}$ to make the two ordinary refractive indexes n$_{o1}$ and n$_{o2}$ lie in or are for the same direction and make the two extraordinary refractive indexes n$_{e1}$ and n$_{e2}$ lie in or are for the same direction, and the interdigital electrode 5 formed on the optical thin-film optical waveguide layer for generating a surface acoustic wave 4 which propagates in a direction opposite to a travelling direction of a guided light beam 3 propagating in the optical waveguide and which has the function to deliver the guided light beam toward the interior of the optical substrate 1 so that the guided light beam may be outputted in a direction which makes an output angle $\theta$ to the surface of the substrate, wherein the relation between the output angle $\theta$ and the two ordinary refractive indexes n$_{o1}$ and n$_{o2}$ or the two extraordinary refractive indexes n$_{e1}$ and n$_{e2}$ satisfies $$n_{o1}\sin\theta < \sqrt{n_{o2}^2 - n_{o1}^2} \text{ or}$$

$$n_{e1}\sin\theta < \sqrt{n_{e2}^2 - n_{e1}^2}$$

to obtain high light deflection efficiency $\eta$.

With this construction, when the output angle $\theta$ of the output light beam 6 is changed by changing the frequency of the high-frequency voltage of high-frequency power supply 7 which is supplied to the interdigital electrode 5, a beam can be obtained which is focused to one point through the focusing lens 8 and which is deflectable in the light deflecting and scanning direction 9.

Figure 5:
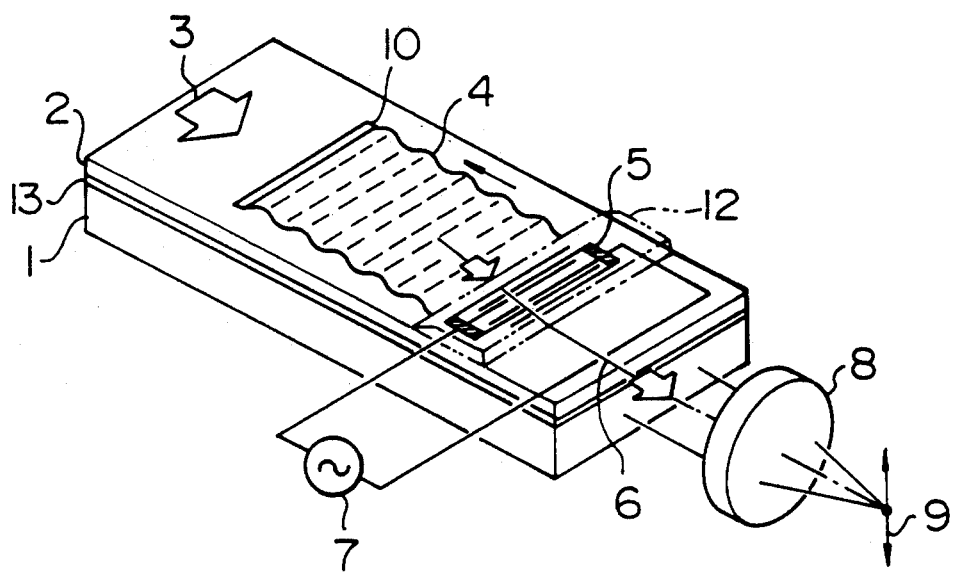
FIG. 5 is a perspective view showing another embodiment of the collinear optical deflector.

Referring to FIGS. 4 and 5, the operation of the collinear optical deflector will now be described. A laser beam 3 propagating in the LiNb$_x$Ta$_{1-x}$O$_3$ thin-film optical waveguide layer 2 formed on the LiTaO$_3$ substrate 1 is diffracted by a surface acoustic wave 4 generated by high-frequency voltage 7 applied to the electrode 5 and propagating in the opposite direction to the laser beam 3, so as to be delivered out of the thin-film optical waveguide layer 2 to provide an output light beam 6. The output angle 8 of the output light beam 6 can be changed by changing the frequency of high-frequency voltage 7 and as a result, the laser beam can be deflected and scanned in the direction of arrow 9.

A method of producing the collinear optical deflector will now be described which uses an ion beam sputtering process to prepare the LiNb$_x$Ta$_{1-x}$O$_3$ thin-film, optical waveguide layer 2 shown in FIG. 4. Firstly, a Z cut LiTaO$_3$ substrate 1 having one surface optically polished is mounted to an ion beam sputtering apparatus not shown having four targets. In the ion beam sputtering apparatus used herein, Ar particles which are controllable in particulate density can be caused independently to impinge on the respective four targets. There are three kinds of targets which are a Li$_2$O target of 2N, a Nb target of 4N and a Ta target of 4N. For any targets, an Ar ion accelerating voltage of 1000 V is used. With the aim of controlling the composition ratio, Ar ion current is set to be 80 mA for the Li$_2$O target, 70 mA for the Nb target and 20 mA for the Ta target. During film formation process, the degree of vacuum in the apparatus is maintained at $1.0 \times 10^{-4}$ Torr. In order to prevent deficit of oxygen O, an O$_2$ gas stream at 20 sccm and an Ar gas stream at 10 sccm are established near the substrate. During film formation process, the substrate temperature is maintained at 600° C. Through the above process, a LiNb$_{0.75}$Ta$_{0.25}$O$_3$ thin film having a composition ratio x = 0.75 and a thickness of 0.3 $\mu$m was formed. Subsequently, the thus formed thin film was annealed at 800° C. in O$_2$ gas ambient atmosphere to compensate for deficit of O$_2$.

The surface of the thus prepared LiNb$_{0.75}$Ta$_{0.25}$O$_3$ thin film was optically polished and the refractive index of the thin film was examined by introducing a He-Ne laser beam of a wavelength $\lambda$ of 633 nm through the use of a rutile prism, demonstrating that a TE$_o$ wave (transverse electric wave) is excited in the light waveguide path and the thin film has an effective refractive index N of 2.197. Further, the light propagation loss was measured by the 2-prism method to obtain an excellent value of 1 dB/cm.

An electrode 5 for excitation of surface acoustic wave made of aluminum, was formed on the optical thin-film, optical waveguide layer 2 through conventional lithography technique. In accordance with the present embodiment, the thin film of Z cut LiNb$_x$Ta$_{1-x}$O$_3$ where x = 0.75 allows the surface acoustic wave 4 to propagate at a speed of 3700 m/s in the X$_2$-axis direction, and the interdigital electrode 5 has a pitch $\Lambda$ of 12.9 $\mu$m, a width W of 2.5 mm and a propagation length L for surface acoustic wave 4 of 20 mm. When the center frequency f$_o$ for electrode 5 is 287 MHz and a light beam of a diffraction order m of $-1$ is used, the output angle $\theta$ is 10 degrees and the deflection angle is 6 degrees in air for an electrode 5 having 20 pairs.

A value of electro-mechanical coupling coefficient K$^2$ of the thus produced optical deflector was calculated based on radiation conductance measurement using a network analyzer to obtain K$^2$ = 0.02 which approximates that of single crystalline LiNbO$_3$ and is excellent. Further, when light deflection efficiency $\eta$ was measured by coupling a He-Ne laser beam of $\lambda = 633$ nm into the thin-film, optical waveguide layer by means of a prism coupler and exciting a $TE_o$ wave, a very high efficiency amounting to $\eta = 90\%$ was obtained for supplied electric power of 0.5 W. This is because in the present embodiment the $LiTaO_2$ substrate 1 has an ordinary refractive index $n_{o1} = 2.1762$, the optical waveguide layer 2 has an ordinary refractive index $n_{o2} = 2.2585$ and the output angle $\theta$ is 10 degrees, thereby ensuring that $n_{o1} \sin \theta = 0.378 < \sqrt{n_{o2}^2 - n_{e1}^2} = 0.605$ stands to satisfy equation (16).

In the above production method, by using a target made of MgO and controlling Ar ion current, a $Li_yMg_zNb_xTa_{1-x}O_3$ thin film can be grown. Preferably, the composition may be represented by $(y+z)/2 \approx 1$ and $0 < x \leq 1$.

A method of producing the collinear optical deflector will now be described which uses a liquid-phase epitaxial growth process to prepare the $LiNb_xTa_{1-x}O_3$ thin-film, optical waveguide layer 2 shown in FIG. 4. Firstly, adjustment of a molten material during epitaxial growth was effected as follows. Powder materials of lithium carbonate $Li_2CO_3$, boric acid $H_3BO_3$, niobium pentoxide $Nb_2O_5$ and tantalum pentoxide $Ta_2O_5$ were respectively metered to provide 20 mol % of $LiNb_xTa_{1-x}O_3$ serving as an optical waveguide layer material and 80 mol % of lithium borate $Li_2B_2O_4$ serving as a flux material, and a mixture of these materials were mixed sufficiently by means of a mortar, then brought into a platinum crucible which was in turn placed in an electric furnace and heated for 3 hours at a temperature of 1200° C. in oxygen and water vapor ambient atmosphere inside the electric furnace, thus preparing a uniform molten material. The prepared molten material was cooled gradually to 800° C. at a cooling rate of 60° C./h and a Z cut $LiTaO_3$ substrate having one surface optically polished was dipped in the molten material for 10 minutes. Thereafter, the molten material and the substrate were separated from each other and the substrate was cooled gradually in the furnace to room temperature at a cooling rate of 30° C./h to grow a $LiNb_xTa_{1-x}O_3$ thin film of 0.35 μm thickness on the substrate. The composition of this epitaxial thin film has a Li: (Ta+Nb) atomic ratio measuring substantially 1:1 and value of composition ratio x measuring 0.25, thus satisfying a molecular formula $LiNb_{0.75}Ta_{0.25}O_3$ stoichiometrically. Preferably, the addition of the aforementioned flux material falls within a range of 70 to 90 mol %. The dipping time depends on the thickness of the thin film but for a thickness approximating 0.5 to 3 μm, it amounts to 10 to 30 minutes. The temperature for heating and melting a mixture of flux material and optical waveguide layer material depends on the value of composition ratio x but preferably it amounts to about (melting point of the mixture plus 200° C.).

When a He-Ne laser beam having a wavelength $\lambda$ of 633 nm was inputted to the thus prepared $LiNb_{0.75}Ta_{0.25}O_3$ thin film by means of a prism coupler, only one TE mode ($TE_o$ mode) was excited and equivalent refractive index $N_o$ of the thin film was 2.197. The light propagation loss was then evaluated by the conventional 2-prism method to obtain a very good value of 1.1 dB/cm for light of the aforementioned wavelength. This is due to the fact that a single crystalline thin film is formed in which the composition is less defective stoichiometrically.

On the thus prepared optical thin-film, optical waveguide layer 2 was formed an electrode 5 for excitation of surface acoustic wave made of aluminum through conventional photolithographic technique. In the present embodiment, the Z cut $LiNb_xTa_{1-x}O_3$ thin film allows the surface acoustic wave 4 to propagate at a speed of 3700 m/s in the $X_2$-axis direction, and the interdigital electrode 5 has a pitch $\Lambda$ of 12.9 μm, a width W of 2.5 mm and a propagation length L for surface acoustic wave of 20 mm. When the center frequency $f_o$ is 287 MHz and a light beam of a diffraction order m of $-1$ is used, the output angle $\theta$ is 10 degrees and the deflection angle is about 6 degrees in air for an electrode 5 having 20 pairs.

A value of electro-mechanical coupling coefficient $K_2$ of the thus produced optical deflector was calculated based on radiation conductance measurement using a network analyzer to obtain $K^2 = 0.015$ which is in excess and superior to that of single crystalline $LiTaO_3$. Further, when light deflection efficiency $\eta$ was measured by coupling a He-Ne laser beam of $\lambda$ 633 nm into the thin-film, optical waveguide by means of a prism coupler and exciting a $TE_o$ wave, a very high efficiency of $\eta = 85\%$ was obtained for supplied electric power of 0.5 W. This value of efficiency substantially equals that of the prior art but while in the prior art the electrode width W is small amounting to 40 μm, the electrode width W in the present embodiment is 2.5 mm, indicating that as compared to the prior art the electrode width is 60 or more times and the density of surface acoustic wave 4 is 1/60 or less times and therefore the obtained value of efficiency is 60 or more times in terms of effective efficiency. One reason for this is that the $LiNb_xTa_{1-x}O_3$ thin film of excellent crystalline properties can be prepared which has large electro-optical coefficient $\gamma_{ijk}$ and photoelastic coefficient $P_{ijkl}$ comparable to those of bulky $LiNbO_3$ and another reason is that the distribution of refractive index of the optical waveguide is in step fashion to increase the overlap of electric field distribution between $TE_o$ guided wave mode and TM radiation mode.

In the previously-described production method, if the starting oxide material is mixed with MgO, a $Li_yMg_zNb_xTa_{1-x}O_3$ thin film can be grown. In this case, the composition ratio may preferably be represented by $(y+z)/2 \approx 1$ and $0 < x \leq 1$.

FIG. 5 is a schematic perspective view showing another embodiment of the collinear optical deflector according to the invention. In FIG. 5, reference numeral 1 designates an optical substrate (Z cut $LiTaO_3$ substrate), 2 an optical thin-film, optical waveguide layer ($Nb_2O_5$ thin-film, optical waveguide layer), 3 a laser beam, 4 a surface acoustic wave, 5 an electrode for excitation of surface acoustic wave (interdigital electrode), 12 a ZnO thin film, 13 a buffer layer (Corning 7059 glass buffer layer), 6 an output light beam, 7 a high-frequency power supply for excitation of surface acoustic wave, 8 a focusing lens (condesing lens), 9 a light deflecting and scanning direction and 10 an absorber material for surface acoustic wave.

The present collinear optical deflector comprises an optical waveguide including a Z cut $LiTaO_3$ substrate 1 serving as the optical substrate as explained in connection with FIGS. 1A, 1B, 2 and 3 and a $Nb_2O_5$ thin-film, optical waveguide layer 2 formed on a Corning 7059 glass buffer layer 13 and serving as the optical thin-film, optical waveguide layer, and an electrode 5 for excitation of surface acoustic wave (interdigital electrode) formed on a ZnO thin film 12 on part of the $Nb_2O_5$ thin-film, optical waveguide layer and having the piezioelectric function, wherein the refractive index vertical to the substrate surface of the optical substrate 1 is an extraordinary refractive index ne1 and the refractive index parallel to the substrate surface is an ordinary refractive index no1.

A method for production of the FIG. 5 collinear optical deflector will now be described. In the present embodiment, the $Nb_2O_5$ thin film 2 and ZnO thin film 12 were both formed through a reactive sputtering process using $O_2$. A target made of Nb of 4N was used for the $Nb_2O_5$ thin film and a target made of sintered ZnO was used for the ZnO thin film 12. The buffer layer 13 was formed by using a glass target made of glass manufactured by Corning corporation (trade name: 7059) without introducing $O_2$.

Firstly, a Corning 7059 glass buffer layer 13 was formed to a thickness of 10 nm a Z cut $LiTaO_3$ substrate 1 by sputtering. Subsequently, a $Nb_2O_5$ thin film 2 was formed to a thickness of 350 nm by $O_2$ reactive sputtering. The thus formed $Nb_2O_5$ thin film has a refractive index of $n_{e2} = n_{o2} = 2.262$ for a He-Ne laser beam having a wavelength of 633 n when measured by an ellipsometer. When the laser beam was introduced to the resulting $Nb_2O_5$ thin film by means of a prism coupler, 31 of $TE_0$ modes were excited and effective refractive index $N_0$ of the thin film was 2.192. The light propagation loss for the laser beam was then measured by the 2-prism method to obtain a good value of 1.5 dB/cm.

Subsequently, a ZnO thin film 12 was formed to 60 nm thickness and thereafter only a portion of the thin film where the electrode 5 for excitation of surface acoustic wave was formed was applied with a mask of photoresist through the conventional photolithographic technique. Then, the ZnO thin film was removed at the other portion than the mask applied portion by dry-etching using Ar and an interdigital electrode 5 of aluminum was formed on the remaining portion of the ZnO thin film 12 through the conventional photolithographic technique. The electrode has exactly the same specification as that of the electrode formed on the $LiNb_xTa_{1-x}O_3$ thin film 2 prepared through the ion beam Sputtering process in FIG. 4. By applying electric power of 0.5 W to the thus produced optical deflector, a light deflection efficiency of $\eta = 0.80$ was obtained.

Even if a titanium oxide $TiO_2$ thin film formed through the $O_2$ reactive sputtering process is used as the thin film of optical waveguide layer, a collinear optical deflector having comparable characteristics can be constructed.

Figure 6:
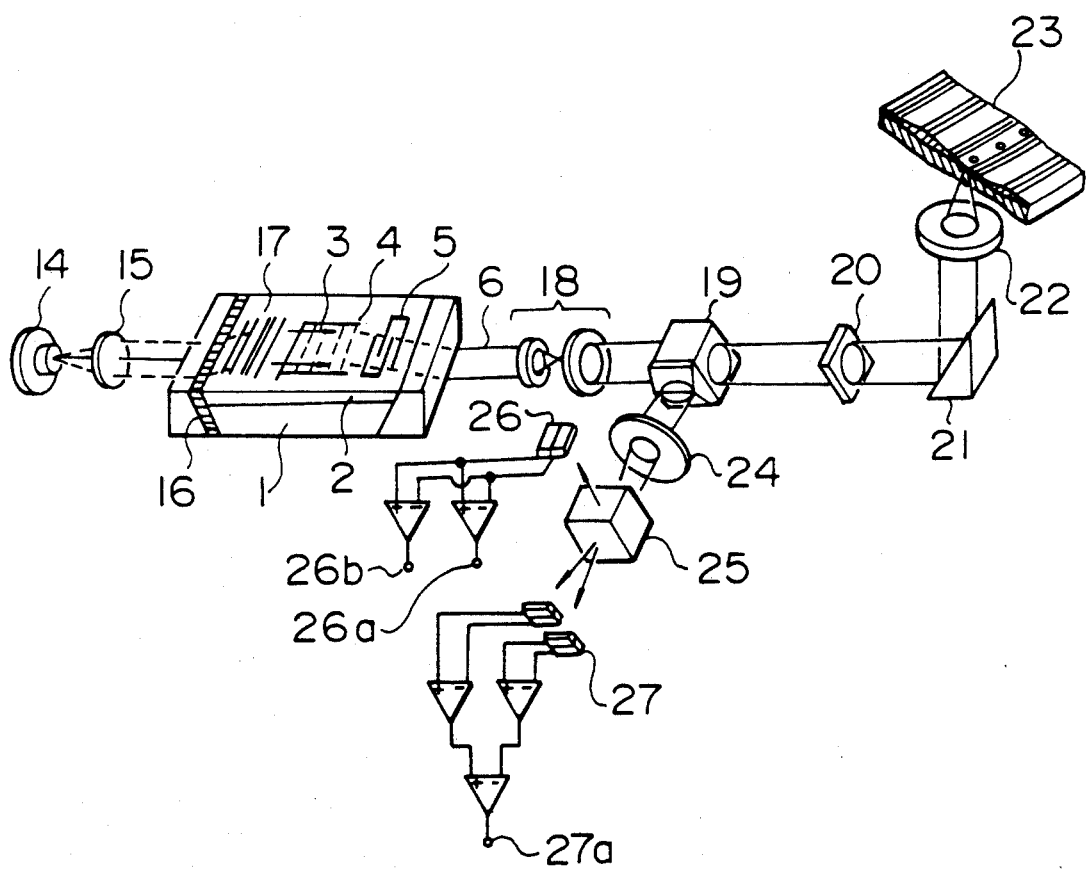
FIG. 6 is a perspective view showing an embodiment of an optical integrated head having an optical deflector apparatus comprised of the collinear optical deflector.

FIG. 6 is a schematic perspective view showing an embodiment of a thin-film, optical integrated head for write-once type optical disc carrying an optical deflector apparatus in the form of the FIG. 4 collinear optical deflector according to the invention. In FIG. 6, reference numeral 14 designates a semiconductor laser, 15 a collimator lens, 16 a transmission type diffraction grating for correction of chromatic aberration used as a first diffraction grating, 17 a grating coupler comprised of a diffraction grating of the optical deflector apparatus and used as light coupling means, 19 a polarization beam splitter, 18 a beam expander, 20 a λ/4 plate, 21 a reflection type diffraction grating for correction of chromatic aberration used as a second diffraction grating, 22 an objective lens used as lens means, 23 an optical disc used as an optical recording medium, 24 a focusing lens, 25 a half mirror, 26 a 2-division photosensor and 27 a 4-division photosensor.

With the above construction, a laser beam emitted from the semiconductor laser 14 is collimated by the collimator lens 15 and subjected to correction in its propagation direction by the diffraction grating 16 for correction of chromatic aberration; and thereafter it is coupled to a $LiNb_xTa_{1-x}O_3$ thin-film, optical waveguide layer 2 formed on a $LiTaO_3$ substrate 1 of the optical deflector by means of the grating coupler 17 of the optical deflector apparatus. Subsequently, the laser beam 3 interacts with a surface acoustic wave 4 generated by an interdigital electrode 5 so as to be delivered into the substrate 1. At that time, by changing center frequency $f_o$ of AC voltage supplied to the electrode 5, the output angle $\theta$ of an output laser beam 6 can be changed. The output laser beam 6 is then enlarged by the light beam expander system 18, passed through the polarization beam splitter 19, circularly polarized by the λ/4 plate 20, corrected in its propagation direction by the reflection type diffraction grating 21 for chromatic aberration, and thereafter focused on the optical disc 23 by means of the objective lens 22. On the other hand, a reflection light beam from the optical disc 23 is reflected by the polarization beam splitter 19, and condensed by the focusing lens 24; and thereafter the reflection beam is divided into beams in two directions so as to be led to the 2-division photosensor 26 and 4-division photosensor 27, thus ensuring detection of a reproduction signal 26a, a tracking error signal 26b and a focusing error signal 27a.

In the optical integrated head of the present embodiment, the reflection type diffraction grating 21 and objective lens 22 constitute an optics incorporated into a head movable part and the major remainder is incorporated into a head stationary part. The actuator drives the head movable part radially of the optical disc 23. The head movable part is mechanically separated from the head stationary part and the two parts are optically coupled to construct the whole of the optical integrated head. Accordingly, the movable part of head can be reduced in size and weight to a great extent and in addition, the access time can be reduced greatly because several to tens of tracks can be accessed finely by changing the center frequency $f_o$ of AC voltage supplied to the electrode 5 for excitation of surface acoustic wave.

In contrast to the separation of the stationary and movable parts of the head as shown in FIG. 6, the two parts may be united with each other to provide a unitary head which may be carried on the actuator. While the present embodiment has been described as applied to the write-once type optical disc unit, the invention can be applied to a rewritable optical disc such as a phase change type optical disc or an optomagnetic disc by constructing the detection optics correspondingly.

Figure 7:
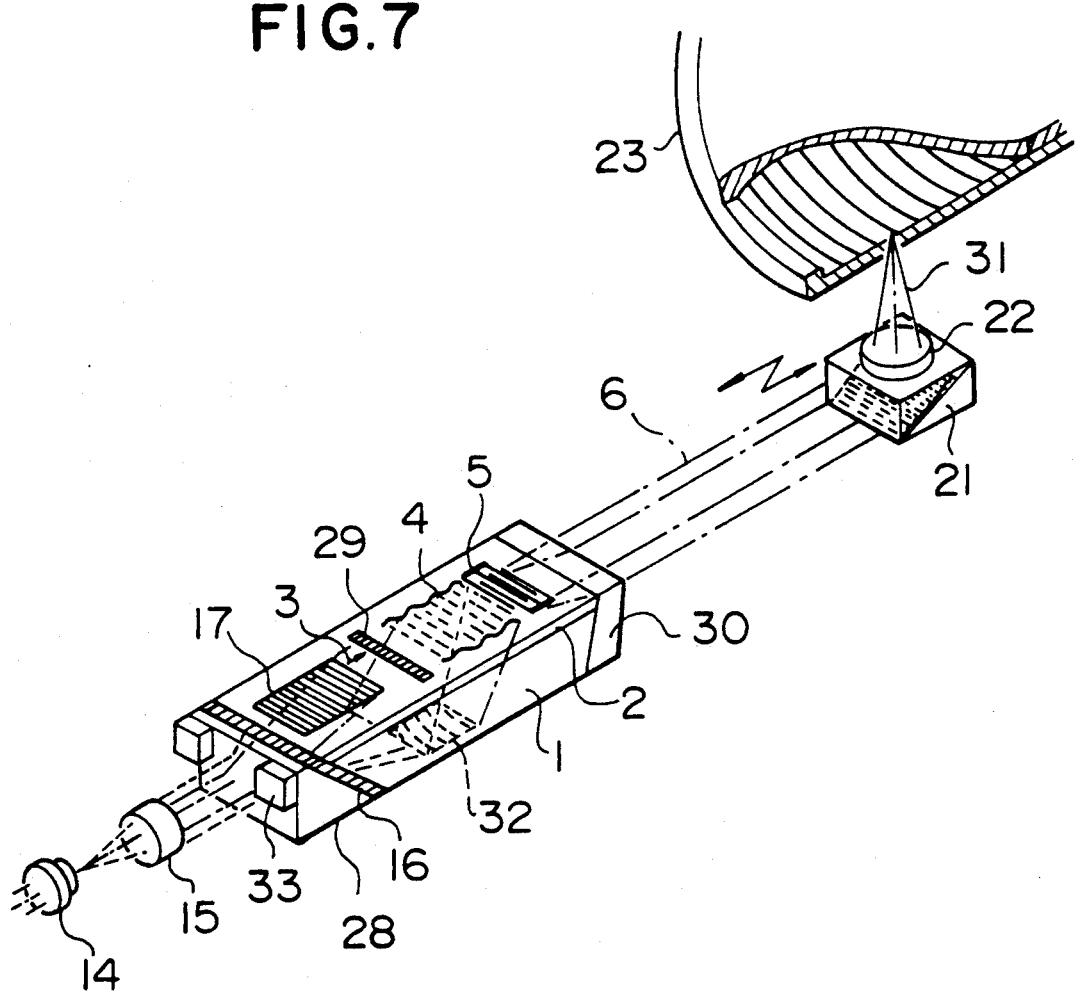
FIG. 7 is a perspective view showing another embodiment of the optical integrated head.

FIG. 7 is a schematic perspective view showing another embodiment of the optical head carrying the optical deflector apparatus using the FIG. 4 collinear optical deflector according to the invention. In FIG. 7, members corresponding to those of FIG. 6 are designated by identical reference characters, and reference numeral 28 designates a prism, 29 a planar diffraction grating, 30 a prism, 31 a converging beam, 32 condensing beam splitter, and 33 a 5-division photodiode.

With the above construction, a laser beam from a semiconductor laser 14 is collimated by a collimator lens 15, refracted by the prism 28 and corrected in its propagation direction by a diffraction grating 16 for correction of chromatic aberration; and thereafter it is coupled to a $LiNb_xTa_{1-x}O_3$ thin-film, optical waveguide layer 2 on a $LiTaO_3$ substrate 1 of the collinear optical deflector by means of a grating coupler 17 of the optical deflector apparatus. Subsequently, the laser beam 3 interferes with the planar diffraction grating 29 for formation of three beams, generating very weak diffracted beams of ±1 orders. This permits the detection, based on 3-spot method, of a signal representative of a tracking error in the optical disc unit. Subsequently, the laser beam 3 interacts with a surface acoustic wave 4 generated by an interdigital electrode 5 so as to be delivered into the substrate 1. At that time, by changing center frequency $f_o$ of AC voltage supplied to the electrode 5, the output angle $\theta$ of an output light beam 6 can be changed. The output beam 6 is refracted by the prism 30, then corrected in its propagation direction by a reflective type diffraction grating 21 for correction of chromatic aberration and focused, in the form of a converging beam 31, on an optical disc 23 by means of an objective lens 22. On the other hand, a reflection beam from the optical disc 23 is passed through the objective lens 22 and reflective type diffraction grating 21, subjected to total reflection at the surface of substrate 1 of the optical deflector, and divided, by means of the condensing beam splitter 32 provided on the opposing surface, into two beams which in turn are focused on the 5-division photodiode to ensure signal detection.

In the optical integrated head of the present embodiment, the reflection type diffraction grating 21 and objective lens 22 constitute an optics incorporated into a head movable part and the major remainder is incorporated into a head stationary part. The actuator drives the head movable part radially of the optical disc 23. The head movable part is separated from the head stationary part and the two parts are optically coupled to complete the whole of the optical integrated head. Accordingly, the head movable part can be reduced in size and weight to a great extent and in addition, the access time can be reduced greatly because several to tens of tracks can be accessed finely by changing the center frequency of AC voltage supplied to the electrode 5 for excitation of surface acoustic wave.

Figure 8:
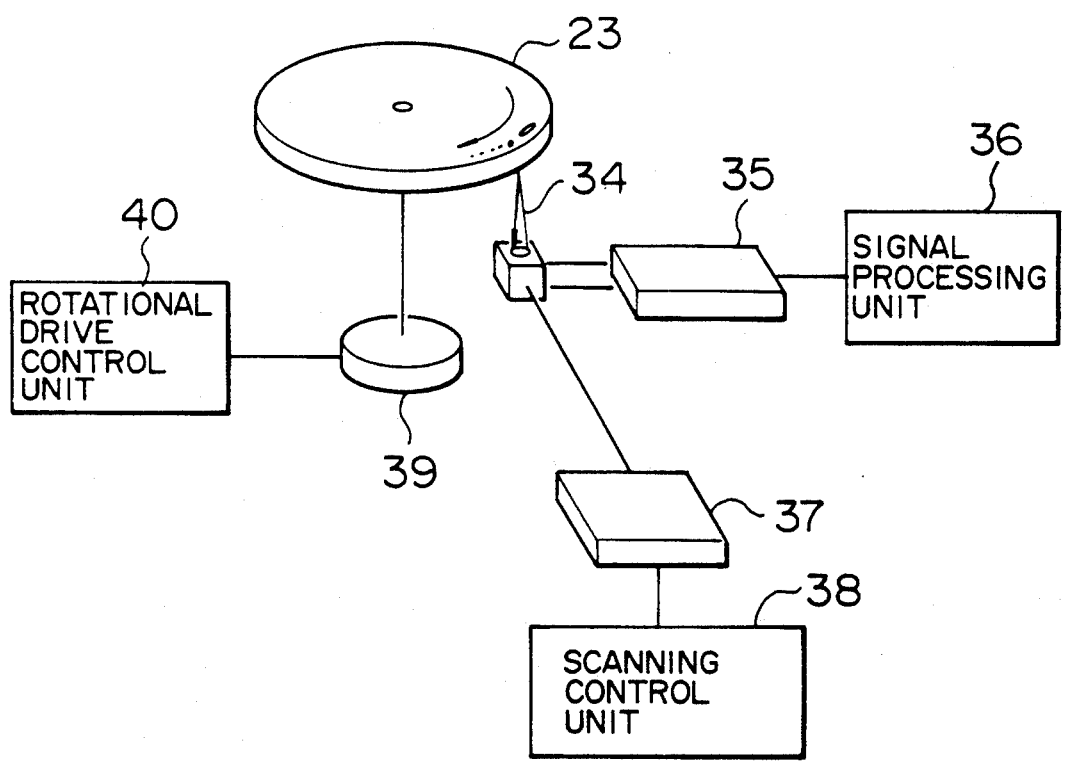
FIG. 8 is a perspective view showing an optical information recording and reproducing apparatus carrying the optical integrated head.
Figure 9:
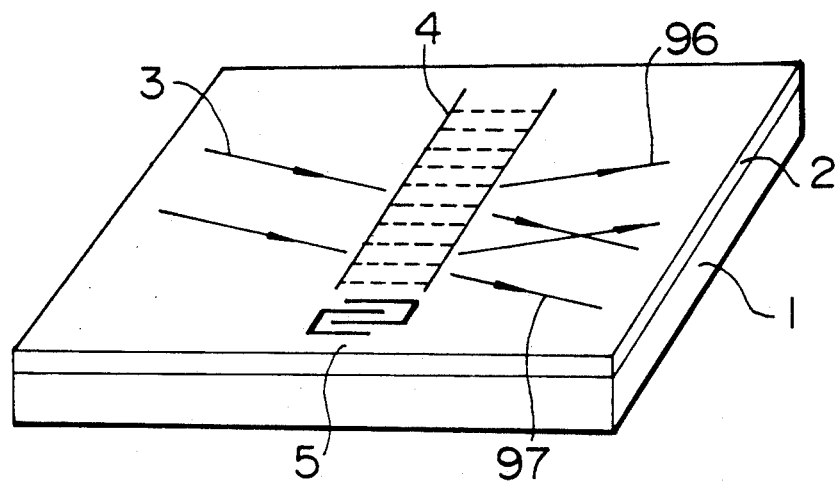
FIG. 9 is a perspective view showing a prior art Bragg type optical deflector.
Figure 10:
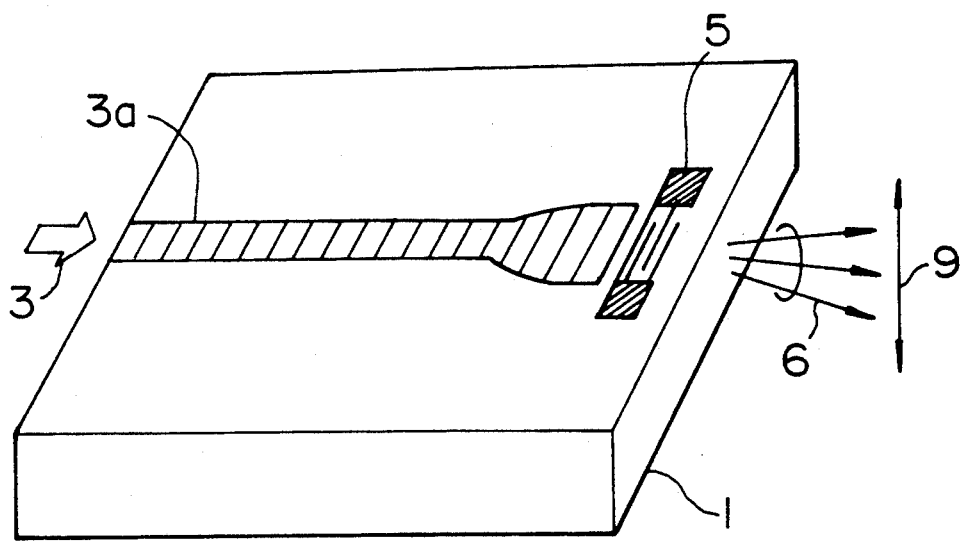
FIG. 10 is a perspective view showing a prior art collinear optical deflector.
Figure 11A:
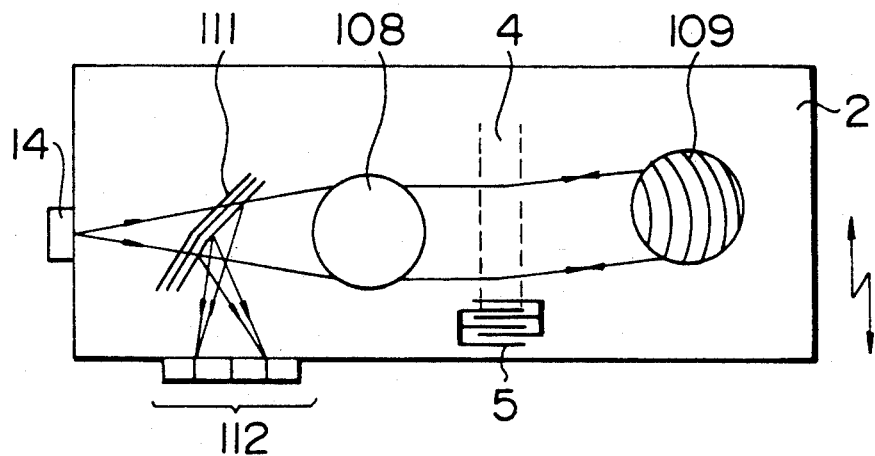
FIGS. 11A and 11B are a plan view and a side view showing a prior art deflector.
Figure 11B:
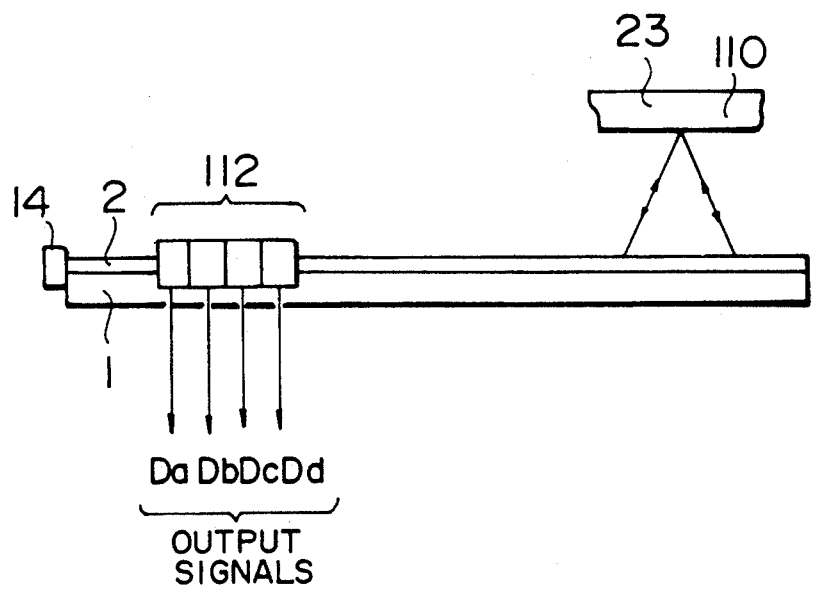
Figure 12:
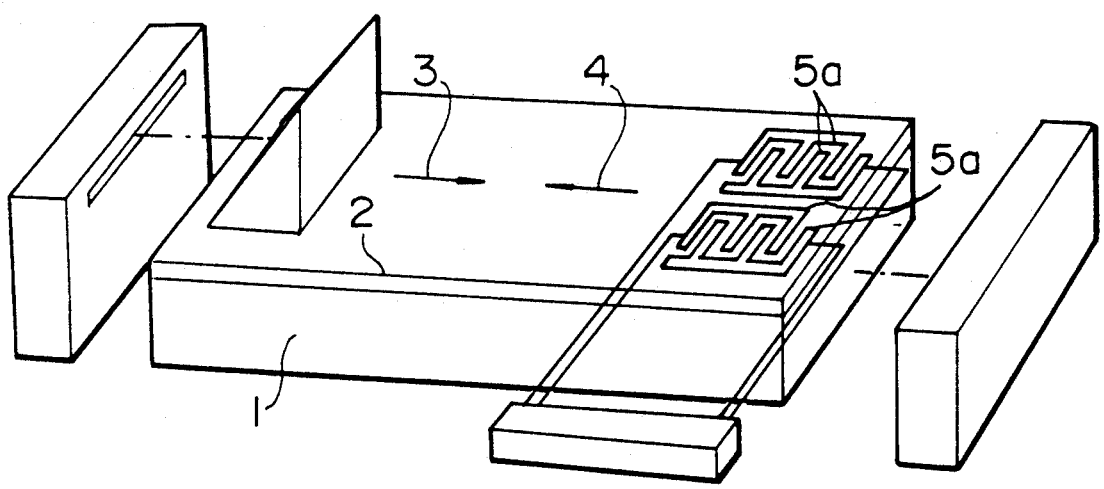
FIG. 12 is a perspective view showing another prior art collinear optical deflector.

FIG. 8 is a schematic diagram showing an embodiment of an optical information recording/reproducing apparatus carrying the FIG. 6 optical integrated head. In FIG. 8, reference numeral 34 designates a head movable part, 35 a head stationary part, 36 a signal processing unit, 37 an actuator, 38 a scanning control unit, 39 a motor and 40 a rotational drive control unit.

With this construction, an optical disc 23 is driven for rotation by the motor 39 controllable by means of the rotational drive control unit 40. The head movable part 34 of the optical integrated head is driven for scanning in the radial direction of the optical disc 23 by the actuator 37 controllable by means of the scanning control unit 38 while being spaced apart from the surface of the rotating optical disc 23 by a predetermined distance. In this manner, through the head stationary part 35 undergoing signal processing conducted by the signal processing unit 36 and the head movable part 35, recording/reproducing of optical information is carried out.

In the optical information recording/reproducing apparatus of the present embodiment, only an optics comprised of the FIG. 6 reflective type diffraction grating 21 and objective lens 22 constituting the head movable part 34 of the optical integrated head is carried on the head movable part 34 and the head stationary part 35 constituting the main body of the optical integrated head is optically coupled to the head movable part 34 but mechanically separated therefrom. Structurally, the entire optical integrated head is therefore divided in accordance with the function into the two, head movable part 34 and head stationary part 35, but the actuator 37 drives only the compact and light optics constituting the head movable part 34, thus setting up very advantageous conditions for accessing to reduce the accessing time to 20 msec or less.

Figure 14:
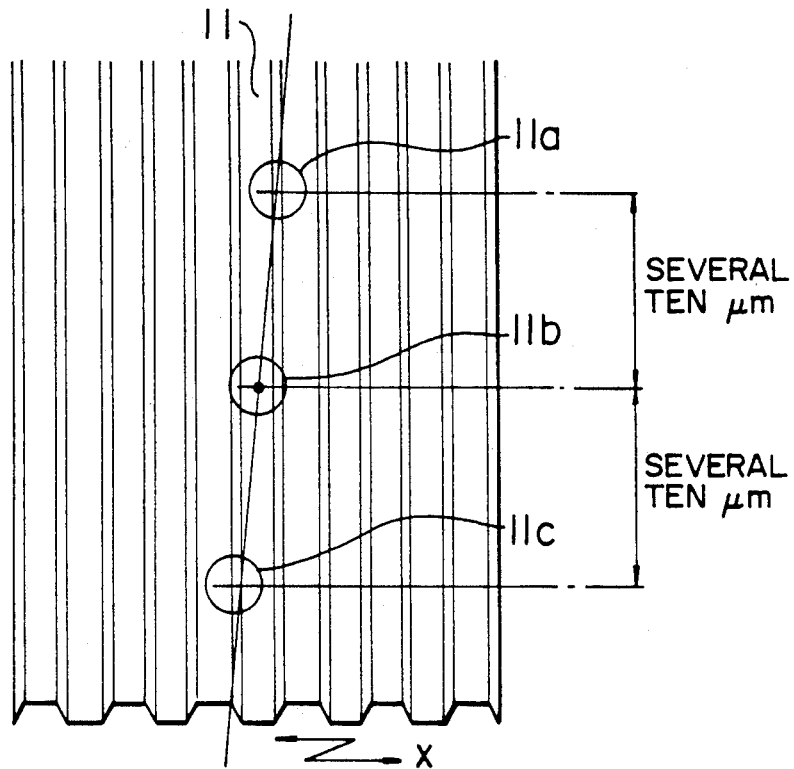
FIG. 14 is an enlarged view showing the relation between a light spot and a track.
Figure 13:
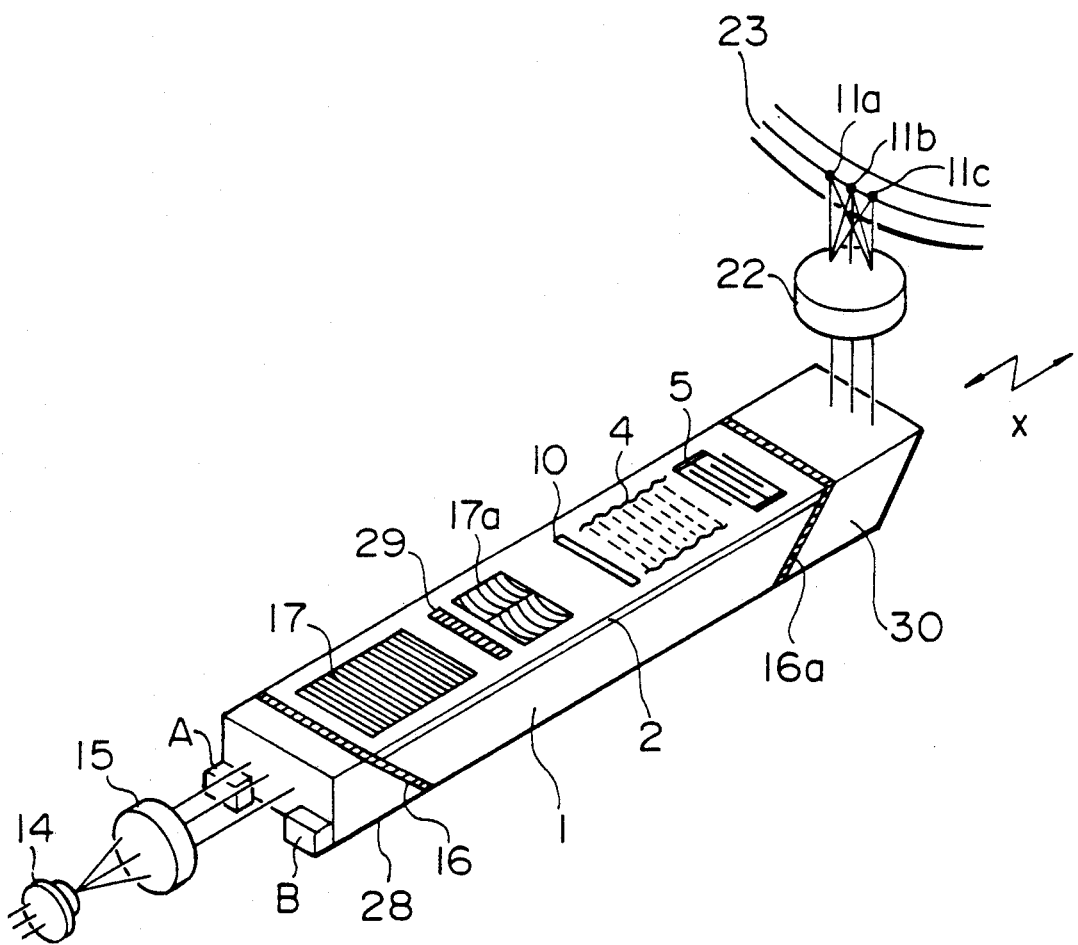
FIG. 13 is a perspective view showing a further embodiment of the collinear optical deflector.

Another example of the optical integrated head will now be described. FIG. 13 shows an example adopting the three-spot method in tracking. A laser beam emitted from a semiconductor laser 14 is converted into a parallel beam by means of a collimator lens 15 and is then caused to impinge upon an optical waveguide layer 2 formed on a substrate 1 through a prism 28, a diffraction grating 16 for correction of wavelength variation and a linear grating coupler 17. The laser beam is divided by a diffraction grating 29 into a beam of zero order and beams of ±1 orders which are necessary for formation of three spots, and the resulting beams interact a surface acoustic wave 4 generated between an electrode 5 and a surface acoustic wave absorber material 10 so as to be delivered to the interior of the substrate 1. The output beams from the substrate are passed through a diffraction grating 16a for correction of wavelength variation, a prism 30 and an objective lens 22, forming a spot 11b for recording/reproducing of information and spots 11a and 11c for tracking on an optical disc 23. Reflection beams representative of information on the optical disc 23 pass through the objective lens 22, prism 30 and diffraction grating 16a correction of wavelength variation and thereafter, they again interact with the surface acoustic wave 4 so as to impinge upon the optical waveguide layer 2 and then are delivered into the substrate 1 by means of a condensing grating coupler 17a, thus being finally focused on sensors A and B each having four division elements. As shown in FIG. 14, the optical spots 11a, 11b and 11c can be lined with an inclination relative to one track 11 by slightly inclining the entire optics and can be scanned simultaneously in x direction by changing the frequency of AC voltage applied to the electrode 5, making it possible to perform fast control of micro-seek and tracking.

Figure 15:
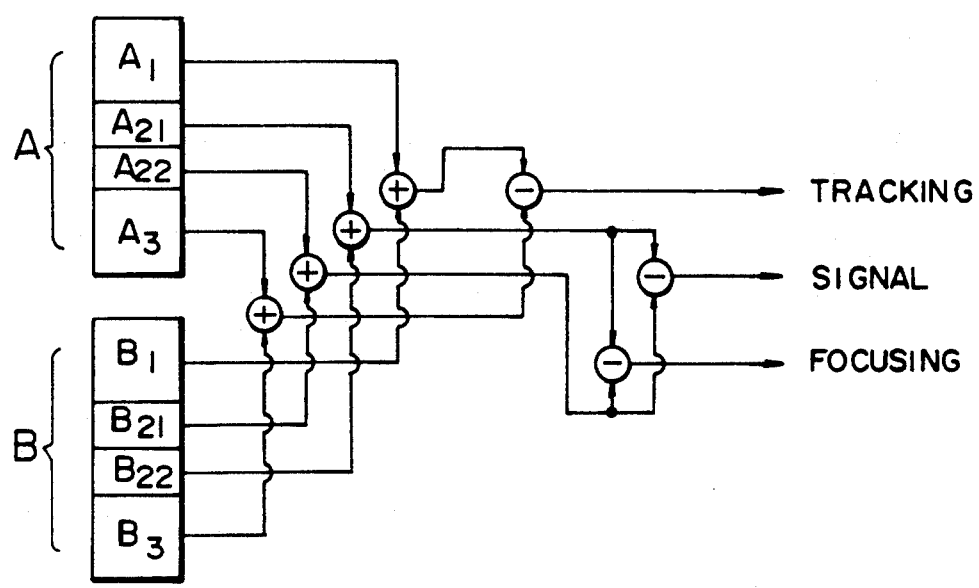
FIG. 15 is a schematic circuit diagram showing an example of a sensor unit.

Each of the sensors A and B includes two sets of four division elements as shown in FIG. 15. Of the returning beams the spot 11a is so focused as to be across a pixel A3 on sensor A and a pixel B3 on sensor B, the spot 11b is so focused as to be across pixels A21 and A22 on sensor A and pixels B21 and B22 on sensor B, and the spot 11c is so focused as to be across a pixel A1 on sensor A and a pixel B1 on sensor B. Accordingly, the three-spot method may be used for tracking by controlling the frequency applied to the electrode 5 such that the sum of outputs of the pixels A1 and B1 equals the sum of outputs of the pixels A3 and B3; and the Foucault method may be used for focusing by controlling an electromagnetic coil adapted to move the objective lens in the optical axis direction such that the sum of outputs of the pixels A21 and B22 equals the sum of outputs of the pixels A22 and B21.

Figure 16:
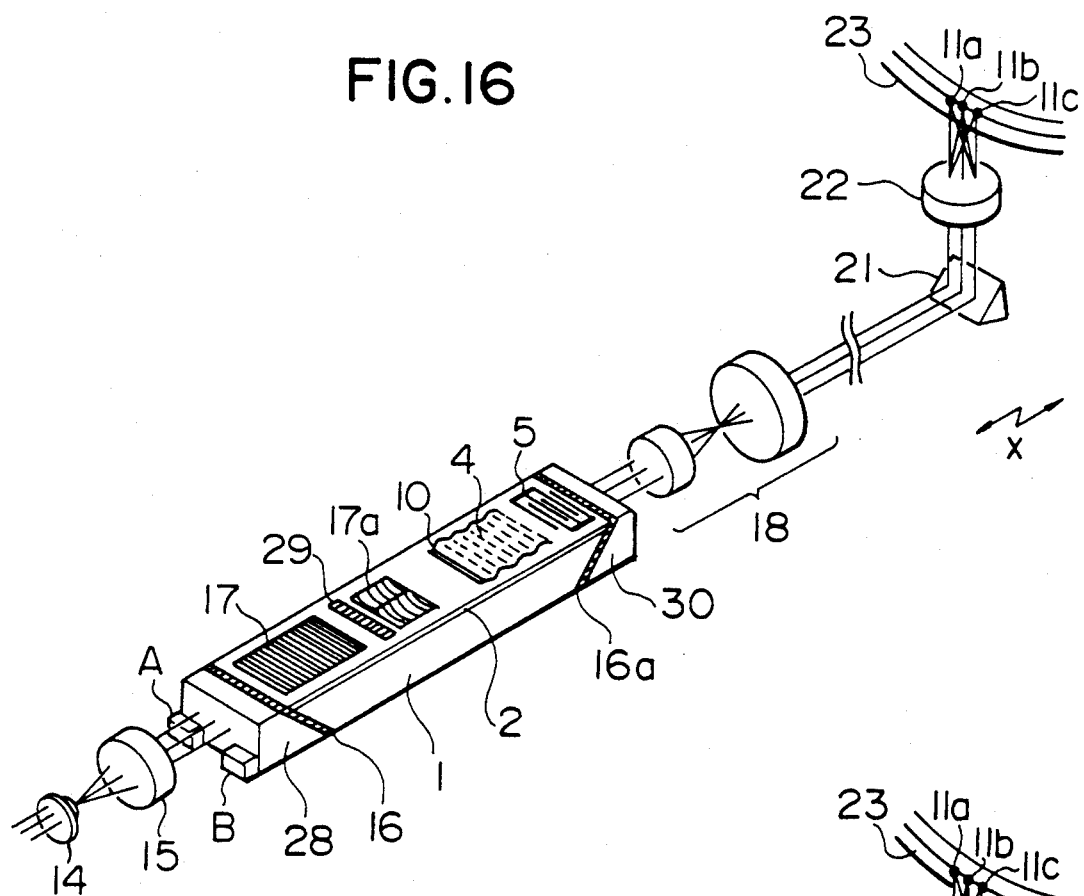
FIGS. 16 and 17 are perspective views showing further embodiments of the collinear optical deflector.

Accordingly, in FIG. 13, the whole of the optics is slidden in x direction of the optical disc 23 by means of another actuator so that fine adjustment may be done. In a further example of the optical integrated head as shown in FIG. 16, a block beginning with a semiconductor laser 14 and ending in a beam expander 18 is made to be stationary and an objective lens 22 and a diffraction grating 21 are made to be movable so that they are slidable in x direction of the optical disc 23, with the aim of reducing the time for micro-seek used to seek tracks. In this embodiment, an optical system preceding a prism 30 is the same as that of the FIG. 13 embodiment.

Figure 17:
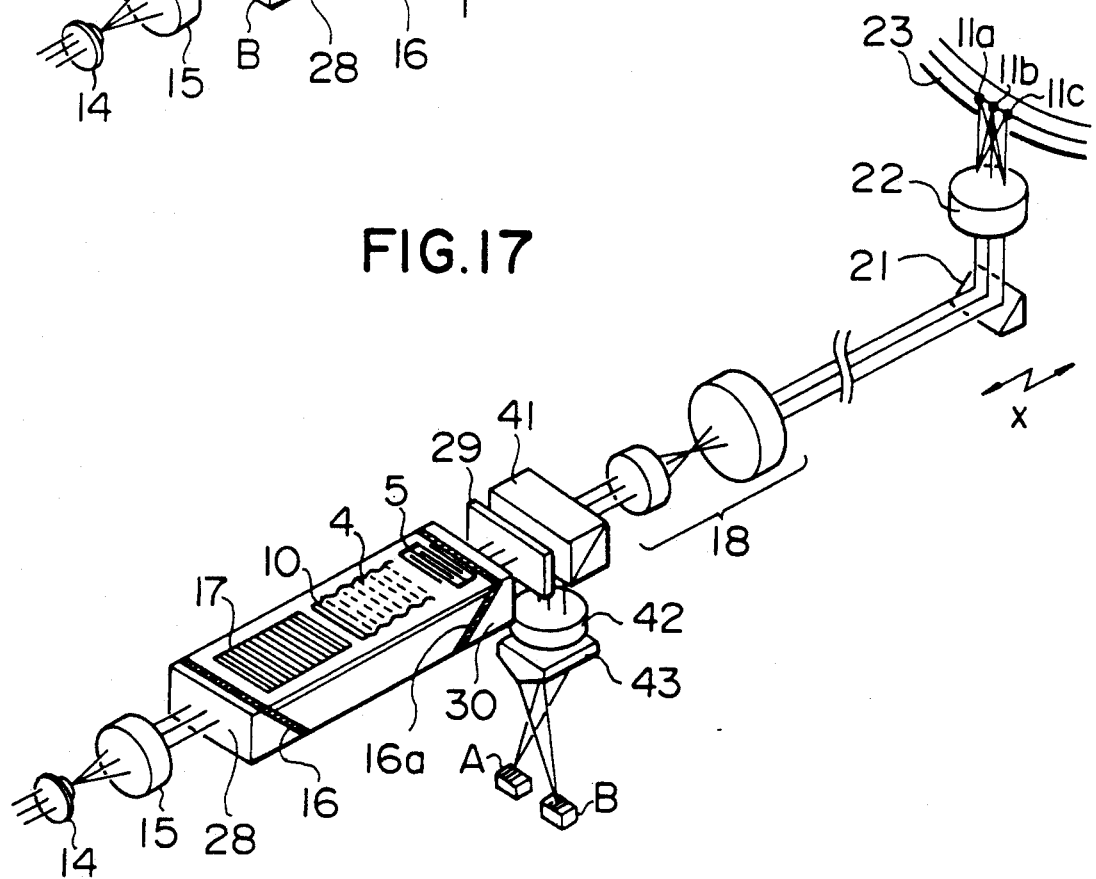
Figure 18:
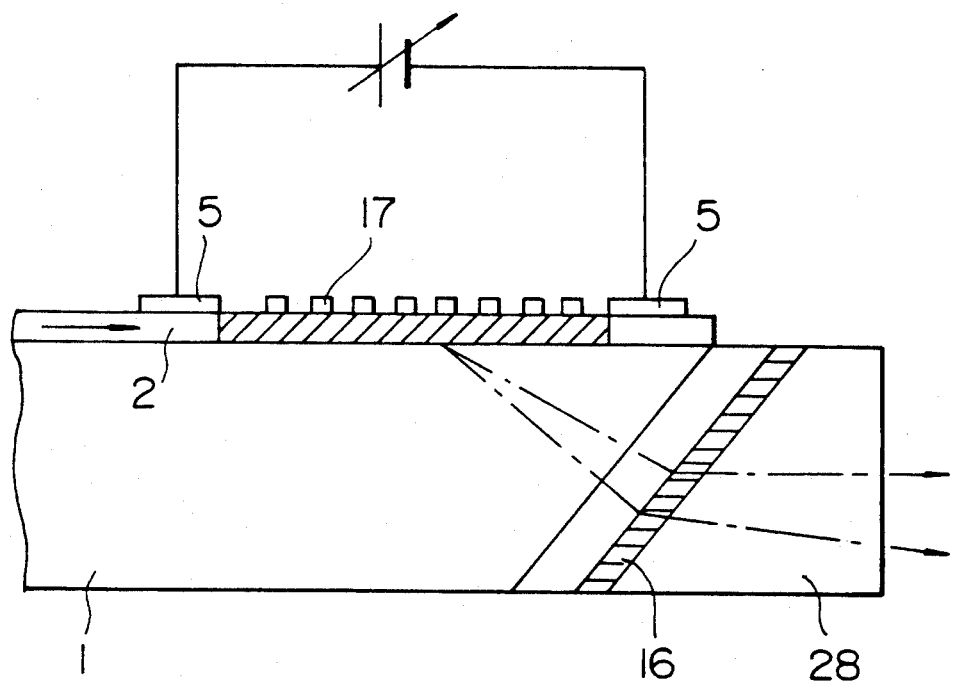
FIG. 18 is an enlarged view showing part of the collinear optical deflector.

In a further embodiment of the optical integrated head as shown in FIG. 17, returning light beams from an optical disc 23 are not returned to an optical waveguide layer 2 but are detected by externally provided sensors A and B. A light beam emitted from a semiconductor laser 14 is passed through a coupling lens 15, a prism 28, a diffraction grating 16 for correction of wavelength variation and a linear grating coupler 17 so as to impinge upon the optical waveguide layer 2 and is deflected when it is delivered out after interaction with a surface acoustic wave 4. Denoted by 29 is a diffraction grating for formation of three spots and this grating may alternatively be formed on the optical waveguide layer 2 as in the case of the FIG. 13 embodiment. A beam splitter 41 is provided in order that the laser beams delivered out of the diffraction grating 29 and passed through a beam expander 18, a diffraction grating 21 and an objective lens 22 can form spots 11a, 11b and 11c on an optical disc 23. Returning beams are deflected by the beam splitter 41 and passed through a condensing lens 42 and a prism 43 so as to be detected by the sensors A and B. The sensors A and B each have four division elements and as in FIG. 5, by using these sensors, tracking can be effected pursuant to the three-spot method and focusing can be effected pursuant to the Foucault method.

In the optical integrated head exemplified in FIGS. 13, 16 and 17, LiNbO$_3$ for the thin-film, optical waveguide layer 2 is subjected to proton exchange. Preferably, the linear grating coupler 17 is made of TiO$_2$ and the electrode 5 is made of aluminum but for convenience sake they may be made of other materials. The light beam from the optical waveguide layer 2 may be delivered into either the substrate 1 or the open air. The objective lens 22 and coupling lens 15 may conveniently take a diffraction grating form or a waveguide-form lens formed on the optical waveguide layer 2. The deflection function based on the use of the surface acoustic wave may be so changed as to be based the electro-optical effect by using a DC power supply. More particularly, a laser beam propagating in the optical waveguide layer 2 is delivered into the interior of the substrate 1 by means of the linear grating coupler 17. At that time, the output angle is determined in accordance with the grating pitch of the linear coupler, the refractive indexes of the substrate 1 and optical waveguide layer 2 and the wavelength of the laser beam. When voltage is applied to the electrode 5, an electric field is generated in a portion of optical waveguide layer 2 which intervenes between fingers of the electrode 5. Since the refractive index of the optical waveguide layer 2 changes with the intensity of the electric field under the influence of the electo-optical effect, the output angle can be changed.

In the foregoing embodiments shown in FIGS. 13, 16 and 17, the three-spot method has been used but if the semiconductor laser 14 is replaced with a multi-beam type having a plurality of light emitting points which are lined parallel to the optical waveguide layer 2, an optics can be provided in which the individual beams are suitably used for recording, erasion and reproduction, respectively. Conveniently, the detection system can be changed to meet its type such as phase-change type and opto-magnetic type, and the tracking and focusing may be based on the push-pull method and sample-and-hold method.

The optical waveguide layer 2 shown in FIGS. 13, 16 and 17 may be prepared through a proton exchange process in order that a light beam which is decreased in ordinary refractive index and changed in polarization can be delivered completely, succeeding in further increasing efficiency. An embodiment of the production of the optical waveguide will now be described by going through first a first production step based on the proton exchange process and then a second production step including the subsequent heat treatment process.

(1) First production step based on proton exchange process

A so-called X cut LiNbO$_3$ wafer which is cut in a direction orthogonal to x-axis of a LiNbO$_3$ single crystal is first prepared and its one surface is polished to about 1/10 of a laser beam wavelength $\lambda$ used, so as to provide a substrate 1. It is preferable that the concentration of transition metal impurities in the crystalline substrate should be suppressed as far as possible. In presently commercialized high-impurity LiNbO$_3$ substrates, the concentration of Fe is about 0.05 ppm and it has been verified that by using this high-impurity LiNbO$_3$ substrate, the threshold of optical damage can be raised by about one order.

After optically polished, the substrate 1 was ultrasonically cleaned in trichloroethylene, isopropyl alcohol, ethanol and pure water and then dried by blowing nitrogen.

Subsequently, the thus treated substrate 1 was subjected to the proton exchange process as follows. The ion exchange process was carried out while the substrate was placed in a container made of quartz. In addition to benzoic acid, carboxylic acid and phosphoric acid such as pyrophosphoric acid may be used as weak acid of a proton exchange source. In the present embodiment, a mixture of benzoic acid and lithium benzoic acid having a dissociation constant of $6 \times 10^{-5}$ was used.

The mixing ratio M is defined by the following equation and in the present embodiment M = 1 stands:

$$M = \frac{\text{Molarity of lithium benzoic acid}}{\text{Molarity of (benzoic acid + lithium benzoic acid)}} \times 100\%$$

In other words, the substrate along with 1.92 g of lithium benzoic acid and 181.35 g of benzoic acid was brought into the quartz container and subjected to heat treatment at 235° C. for 15 minutes. After completion of heat treatment, the substrate was taken out of the quartz container and ultrasonically cleaned in ethanol and pure water. In this manner, an optical waveguide layer 2 of 0.9 μm thickness was formed on the surface layer of the LiNbO$_3$ substrate through the proton exchange process.

(2) Second production step including heat treatment process after proton exchange Subsequently, the substrate 1 thus subjected to the proton exchange process in the first production step was placed in a thermal diffusion furnace and it was heat-treated in atmosphere at 400° C. for 65 minutes and then chilled.

Figure 19:
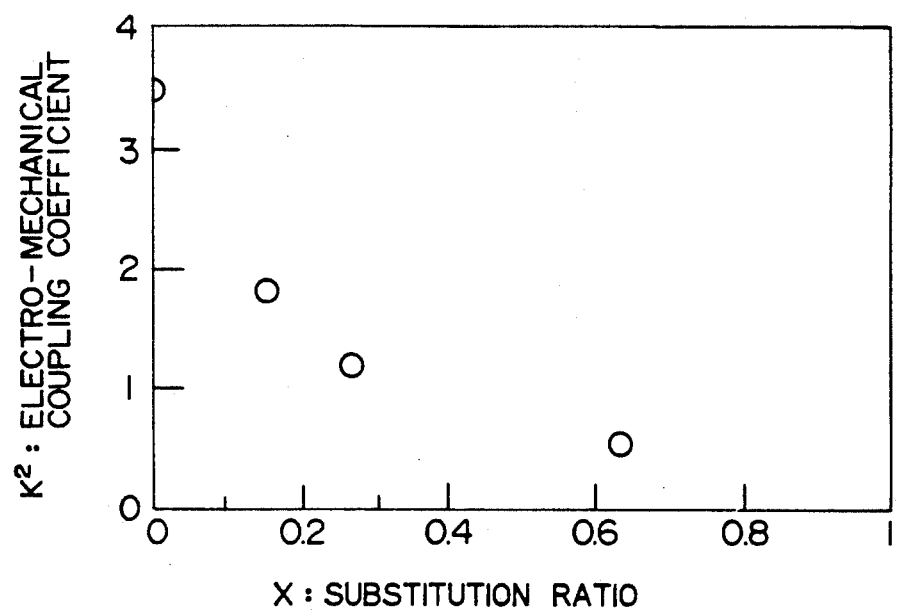
FIG. 19 is a graph showing the relation between substitution ratio x of an $LiNbO_3$ optical waveguide layer subjected to proton exchange and electromechanical coupling coefficient $K^2$.

The absolute amount and distribution in depth direction of proton in the optical waveguide layer in the course of the first and second production steps were measured by the nuclear reaction method to determine a ratio of substitution for Li of bulky LiNbO₃. After the first step, the concentration distribution of proton was of a step type but after the second step, it turned into an auxiliary error function type and the refractive index distribution also turned into the same type correspondingly. The substitution ratio was 0.3 or more in the case of the former distribution type but in the case of the latter distribution type it was 0.3 or less even in the surface of the optical waveguide layer where the proton concentration is maximum. The light deflection efficiency of the optical waveguide layer which had experienced the second step was as large as 10 times or more that of an optical waveguide layer which had not gone through the second step. This is because the substitution ratio x is limited to 0.3 or less at any portion of the LiNbO₃ optical waveguide layer subjected to proton exchange and as a result a value of electromechanical coupling coefficient $K^2$ comparable to that of bulky LiNbO₃ can be obtained to generate a large strain S and besides values of photoelastic coefficient and electo-optical coefficient comparable to those of bulky LiNbO₃ can be obtained to realize large $\Delta B_{13}$. The relationship between the substitution ratio X and the electromechanical coupling coefficient $K^2$ is apparent from FIG. 19 which is already described as a result of experiment.

As described above, according to the present invention, the optical head can be reduced in size and weight by providing a highly efficient collinear optical deflector and integrating various optical elements to facilitate accessing the neighborhood of a desired track to thereby reduce the access time and besides realize highly accurate and highly reliable recording or reproduction of information on or from an optical recording medium.

Further, according to the invention, a plurality of optical spots can be deflected simultaneously at high speeds to effect more accurate tracking, recording, erasion, or reproduction immediately after recording to thereby reduce the time for micro-seek.

We claim:

1. A collinear optical deflector comprising:
   an optical waveguide including an optical substrate which serves as either an optical substrate having anisotropy of refractive index to exhibit an ordinary refractive index $n_{o1}$ and an extraordinary refractive index $n_{e1}$ or an isotropic optical substrate exhibiting $n_{o1}=n_{e1}$ and an optical thin-film optical waveguide layer formed on said optical substrate and serving as either an optical thin-film optical waveguide layer having anisotropy of refractive index to exhibit an ordinary refractive index $n_{o2}$ and an extraordinary refractive index $n_{e2}$ or an isotropic optical thin-film optical waveguide layer exhibiting $n_{o2}=n_{e2}$, wherein the two ordinary refractive indexes $n_{o1}$ and $n_{o2}$ lie in or are for the same direction and the two extraordinary refractive indexes $n_{e1}$ and $n_{e2}$ lie in or are for the same direction; and
   an electrode formed on said optical thin-film optical waveguide layer for generating a surface acoustic wave which propagates in a direction opposite to a propagation direction of a laser beam propagating in said optical thin-film optical waveguide layer and causes the laser beam to be delivered out of said optical thin-film optical waveguide layer in a direction which makes an angle $\theta$ to the surface of said optical thin-film optical waveguide layer,
   wherein said optical waveguide is formed such that $$n_{o1}\sin\theta < \sqrt{n_{o2}^2 - n_{o1}^2} \text{ or}$$

$$n_{e1}\sin\theta < \sqrt{n_{e2}^2 - n_{e1}^2}$$

where $n_{o1}$ is the ordinary refractive index that said optical substrate exhibits for an ordinary beam, $n_{e1}$ is the extraordinary refractive index that said optical substrate exhibits for an extraordinary beam, $n_{o2}$ is the ordinary refractive index that said optical thin-film optical waveguide layer exhibits for the ordinary beam and $n_{e2}$ is the extraordinary refractive index that said optical thin-film, optical waveguide layer exhibits for the extraordinary beam.

2. A collinear optical deflector according to claim 1 wherein said optical substrate is made of lithium tantalate LiTaO₃ and said optical thin-film optical waveguide layer is made of lithium niobate LiNbO₃ or tantalic lithium niobate LiNb$_x$Ta$_{1-x}$O₃ where $0<x\leq 1$.

3. A collinear optical deflector according to claim 1 wherein said optical substrate is made of lithium tantalate LiTaO₃ and said optical thin-film optical waveguide layer is made of lithium niobate magnesium Li$_y$Mg$_z$NbO₃ where $(y+z)/2\approx 1$ or tantalic lithium niobate magnesium Li$_y$Mg$_z$Nb$_x$Ta$_{1-x}$O₃ where $(y+z)/2\approx 1$ and $0<x\leq 1$.

4. A collinear optical deflector according to claim 1 wherein refractive indexes of said optical substrate and said optical thin-film optical waveguide layer vertical to their surfaces are the extraordinary refractive indexes $n_{e1}$ and $n_{e2}$, respectively and their refractive indexes parallel to their surfaces are the ordinary indexes $n_{o1}$ and $n_{o2}$, respectively.

5. A collinear optical deflector according to claim 1 wherein said optical substrate is made of lithium tantalate LiTaO₃ and said optical thin-film optical waveguide layer is made of niobium pentoxide Nb₂O₅ or titanium oxide TiO₂.

6. A collinear optical deflector according to claim 5 wherein the refractive index of said optical substrate vertical to its surface is the extraordinary refractive index $n_{e1}$ and its refractive index parallel to its surface is the ordinary refractive index $n_{o1}$.

7. A collinear optical deflector according to claim 1, wherein the optical thin-film optical waveguide layer is made of an anisotropic material having anisotropy of refractive index, and wherein protons are substituted for part of elements constituting the anisotropic material.

8. A collinear optical deflector according to claim 1, wherein the optical thin-film optical waveguide layer is made of an anisotropic material having anisotropy of refractive index, and wherein protons are substituted for part of elements constituting the anisotropic material at a substitution ratio of 0.3 or less.

9. An optical integrated head having means for guiding a laser beam from a laser light source to an optical waveguide, focusing the guided laser beam on a recording surface of a recording medium disposed spatially externally of said optical waveguide while causing the laser beam to scan on said recording surface and receiving a reflection beam from said recording surface, comprising:

a collinear optical deflector including an optical waveguide comprised of an optical substrate and an optical thin-film optical waveguide layer, and an electrode formed on said optical thin-film optical waveguide layer, for exciting a surface acoustic wave;

an optical deflector apparatus including light coupling means, provided in said collinear optical deflector, for coupling the laser beam into said optical thin-film optical waveguide layer;

a first diffraction grating interposed between said laser light source and said light coupling means, for preventing the efficiency of coupling of said laser beam to said optical waveguide from being degraded owing to variations in wavelength of said laser beam;

a second diffraction grating for receiving the laser beam from said collinear optical deflector and preventing the delivery direction of the laser beam from said optical deflector from being changed with variations in laser wavelength; and lens means for focusing said laser beam passed through said second diffraction grating on the recording surface of said recording medium disposed spatially externally of said optical waveguide.

10. An optical integrated head according to claim 9 further comprising a planar diffraction grating interposed between said electrode for exciting a surface acoustic wave and said light coupling means, for diffracting said laser beam in a direction of width of said optical thin-film optical waveguide layer.

11. An optical integrated head according to claim 9 wherein said second diffraction grating and said lens means constitute a head movable part which is driven for scanning radially of said recording medium, said optical deflector apparatus including said laser light source and collinear optical deflector constitutes a head stationary part, and said head movable part is mechanically separated from said optical thin-film optical waveguide layer constituting part of said collinear optical deflector included in said head stationary part.

12. An optical integrated head according to claim 9 wherein high-frequency voltage is applied to said electrode.

13. An optical integrated head according to claim 11 wherein said head stationary part comprises a collinear optical deflector including at least a laser light source for generating a laser beam for recording and reproducing information on and from said recording surface, an optical substrate and an electrode formed on said optical substrate for exciting a surface acoustic wave.

14. An optical integrated head according to claim 11 wherein said head movable part comprises at least a diffraction grating for diffracting the laser beam from said head stationary part toward the recording surface of said recording medium and an objective lens for focusing said laser beam, and said head movable part is mechanically separated from said optical thin-film optical waveguide layer constituting part of said collinear optical deflector included in said head stationary part.

15. An optical information recording and reproducing apparatus comprising:

an optical recording medium for recording and reproducing information;

a laser light source for generating at least one laser beam;

an optical integrated head including:

an optical waveguide adapted to guide the at least one laser beam from said laser light source and including an optical substrate and an optical thin-film optical waveguide layer, output means for outputting said at least one laser beam from said optical waveguide including a linear grating for guiding the at least one laser beam from said laser light source to said optical thin-film optical waveguide layer, and a DC power supply for including a surface acoustic wave in said optical waveguide propagating in a substantially collinear relationship with the at least one laser beam to change a refractive index of said optical waveguide for the at least one laser beam under the influence of an electro-optical effect, and an electrode for controlling an output angle at which the at least one laser beam is outputted form said optical waveguide by changing a wavelength of said surface acoustic wave, thereby deflecting the outputted at least one laser beam to scan the outputted at least one laser beam in a radial direction of said optical recording medium; and optical means for focusing said outputted at least one laser beam on a recording surface of said optical recording medium.

16. An optical information recording and reproducing apparatus according to claim 15, wherein the optical means includes a beam expander for expanding the outputted at least one laser beam.

17. An optical information recording and reproducing apparatus according to claim 16, wherein the optical means further includes a detection unit disposed between the optical integrated head and the beam expander, and wherein the detection unit includes:

a diffraction grating disposed between the optical waveguide of the optical integrated head and the beam expander;

a beam splitter disposed between the diffraction grating and the beam expander;

a condensing lens for condensing a laser beam received from the beam splitter;

a prism for splitting the condensed laser beam into two laser beams; and two optical sensors for respectively detecting the two laser beams.

18. An optical information recording and reproducing apparatus according to claim 15, wherein the optical means includes a diffraction grating and an object lens for diffracting the outputted at least one laser beam and focusing the diffracted outputted at least one laser beam on the recording surface of the optical recording medium.

* * * * *